United States Patent
Mosby et al.

(10) Patent No.: US 10,695,725 B2
(45) Date of Patent: Jun. 30, 2020

(54) INTERCALATION MEMBRANE

(71) Applicant: Field Upgrading Limited, Calgary (CA)

(72) Inventors: James M. Mosby, Sandy, UT (US); Thomas Hinklin, Sandy, UT (US)

(73) Assignee: Enlighten Innovations Inc., Calgary (CA)

( * ) Notice: Subject to any disclaimer, the term of this patent is extended or adjusted under 35 U.S.C. 154(b) by 96 days.

(21) Appl. No.: 15/449,159

(22) Filed: Mar. 3, 2017

(65) Prior Publication Data

US 2017/0256802 A1 Sep. 7, 2017

Related U.S. Application Data

(60) Provisional application No. 62/303,242, filed on Mar. 3, 2016.

(51) Int. Cl.
*B01D 71/02* (2006.01)
*C25C 7/04* (2006.01)
(Continued)

(52) U.S. Cl.
CPC .............. *B01D 71/02* (2013.01); *B01D 61/46* (2013.01); *B01D 67/0046* (2013.01); *C02F 1/46104* (2013.01); *C25B 13/04* (2013.01); *C25C 7/04* (2013.01); *H01M 8/0215* (2013.01); *H01M 8/188* (2013.01); *B01D 2325/42* (2013.01);
(Continued)

(58) Field of Classification Search
None
See application file for complete search history.

(56) References Cited

U.S. PATENT DOCUMENTS 8,449,747 B2 5/2013 Boulanger et al.
2010/0252442 A1* 10/2010 Boulanger .............. C02F 1/469
205/337

(Continued)

OTHER PUBLICATIONS

Seghir et al, Electrochemical reactions of reversible intercalation in Chevrel compounds for cationic transfer—Principle and application on Co2+ ion, Electrochemistry Communications, vol. 10, No. 10, Oct. 2008, pp. 1505-1508 (Year: 2008).*

(Continued)

*Primary Examiner* — Harry D Wilkins, III
(74) *Attorney, Agent, or Firm* — Foley & Lardner LLP

(57) ABSTRACT

An ion conductive intercalation membrane is useful to separate anode and cathode compartments in an electrochemical cell and provide ion transport between the anode and cathode compartments. The intercalation membrane does not receive and release electrons during operation of the electrochemical cell. An electric potential and current source is connected to an anode and a cathode disposed in respective anode and cathode compartments to cause oxidation and reduction reactions to occur at the anode and cathode, to cause electrons to flow through an external circuit coupled to the anode and cathode, and to cause ions to transport through the intercalation membrane to maintain charge neutrality within the electrochemical cell. The electrochemical cell operates at a current density greater than 25 mA/cm² across the intercalation membrane.

8 Claims, 20 Drawing Sheets

(51) Int. Cl.
     *C02F 1/461*     (2006.01)
     *C25B 13/04*     (2006.01)
     *B01D 61/46*     (2006.01)
     *H01M 8/0215*     (2016.01)
     *B01D 67/00*     (2006.01)
     *H01M 8/18*     (2006.01)
     *C02F 1/467*     (2006.01)

(52) U.S. Cl.
     CPC ... *C02F 1/4672* (2013.01); *C02F 2201/46115* (2013.01)

(56) References Cited

U.S. PATENT DOCUMENTS

| | | |
|---|---|---|
| 2012/0175268 A1 | 7/2012 | Joshi et al. |
| 2013/0126354 A1 | 5/2013 | Lecuire et al. |
| 2014/0199577 A1 | 7/2014 | Bhavaraju |
| 2014/0212707 A1 | 7/2014 | Bhavaraju et al. |

OTHER PUBLICATIONS

International Search Report and Written Opinion in PCT/US2017/020680 dated Jun. 14, 2017 (15 pages).

Lerf, A. Dalton Transactions, 2014, 43(27), pp. 10276-10291 (author version).

\* cited by examiner

INTERCALATION MEMBRANE

CROSS-REFERENCE TO RELATED APPLICATION

This application claims the benefit of U.S. Provisional Application No. 62/303,242, filed Mar. 3, 2016, entitled "INTERCALATION MEMBRANE," which patent application is hereby incorporated by reference.

FIELD OF THE INVENTION

The present invention relates in general to an intercalation membrane useful to transport ions between two compartments of an electrochemical cell by the application of an electrochemical potential. More specifically this invention discloses a novel membrane that can improve the functionality of electrochemical cells for a variety of applications. Some non-limiting examples are in separation, recycling, reclamation, decontamination, electrochemical synthesis, and sensors.

BACKGROUND OF THE INVENTION

The use of ion conducting membranes or electrochemical transfer walls to transfer ions between two separate compartments of electrochemical cells has been known for a long time. The concept is used commercially in a variety of applications where processes based on one or more electrochemical reactions are improved by separating the reaction that occurs at the anode from the reaction that occurs at the cathode. Classically this separation is achieved using materials that permit cations or anions to be transferred preferentially over the solvent and other chemical species through a micro/nano-porous network (porous ion conducting membranes, for example polymer ion conducting membranes) or through conduction pathways created by the crystal structure of the specific material (dense ion conducting membrane, for example ion conducting ceramic or ion conducting glass membranes). In both cases, migration due to an external electric field causes ions to transfer through the separating material without the ion or the material changing its electronic state.

Conversely, U.S. Pat. No. 8,449,747 B2 describes the use of an electrochemical transfer wall to separate two electrochemical reactions occurring in separate compartments, the wall being made of a material that permits the intercalation of ions into it on the first side of the wall and de-intercalation out of it on the second side of the wall. U.S. Pat. No. 8,449,747 B2 and U.S. Publication No. 2013/0126354 A1 teach that the difference between an ion conducting membrane and electrochemical transfer wall is the diffusion of ions through the electrochemical transfer wall is accompanied by an electron transfer from the wall and then a subsequent electron transfer to the wall. This electron transfer causes the material to undergo a change in electronic structure during the intercalation, the diffusion, and the de-intercalation of the ion.

Under an electric field, porous ion conducting membranes, such as polymer ion conducting membranes, permit the ions to transfer from a first medium to a second medium through micro/nano-porous networks. Depending on presence of counter ions in the pores these membranes can preferentially conduct either positive or negative ions. These membranes are used commercially for a variety of electrochemical processes due to their relatively high conductivity, ease of manufacture and desirable physical properties. Currently, there are many limitations to porous ion conducting membranes or areas which industry requires improvement. Some non-limiting examples of these limitations will now be given.

First they permit the conduction of all similarity charged species, for example a cationic polymer membrane will transfer any positively charge species from a first solution to a second solution as long as it is smaller than the smallest pore diameter, otherwise it will clog the pores and inhibit the transfer of other ions. This is also true for the conduction of anions through anionic polymer membranes. The lack of selectivity in porous ion conducting membranes reduces the benefit of using a membrane to separate the reactions occurring at the two electrodes. In either case when the porous membranes are not under an applied electric field, the separation afforded by the electric field will be lost, and the concentration gradients generated by the electrical field will cause the ions to diffuse back through the membrane. These types of membranes can also foul easily due to ions or other objects present in the electrolyte that are larger than the smallest pore, but smaller than the larger pores, migrating into and become lodged in the membrane, inhibiting any further ion transfer through that pathway. In summary, the inherent properties of porous ion conducting membranes, inhibits them from truly keeping the medium on one side of the membrane from interacting with the medium on the other side of the membrane.

Under an electric field, dense ionic conducting membrane, such as ceramic or glass ionic conducting membranes, permit ions to transfer from a first medium to a second medium through conduction pathways present in their crystal structure or grain boundaries. This permits dense membranes without micro/nano-pores to be used to separate the reactions occurring at the anode and cathode. The transfer of ions in dense ion conducting membranes is therefore selective to ions that can be inserted into the crystal structure of the material without causing an irreversible change to the crystal structure. This selectivity addresses many issues found for porous ion conducting membranes including inhibiting the first medium from contaminating or being contaminated by the second medium, the membranes do not foul due to pore blockage, and they do not permit any back diffusion to occur. Also because the diffusion is occurring within the crystal structure and not from micro/nano-pores the only communication between the two mediums is the ion which can be transferred by the crystal-structure or grain boundary of the material making up of the membrane. Thus, dissimilar mediums can be used that are specifically chosen for the two electrochemical reactions that are occurring at the electrodes. One limitation with dense ion conducting membranes is there are only a limited number of known materials which conduct a limited number of ions at conditions that are amendable to practical applications.

Under an electric field, an electrochemical transfer wall or junction, U.S. Pat. No. 8,449,747 B2, permits ions to transfer from a first solution to a second solution by first intercalating the ion at the interface between the wall and the first solution and then migration of the ion through the wall, followed by the de-intercalation of the ion at the interface of the wall and the second solution. Intercalation and de-intercalation as used herein, refer to a process involving both ion and electron transfer at the interface. Thus, the electronic state of the wall changes as the ion is transferred from a first solution to a second solution. Like ionic conducting ceramic membranes, the electrochemical transfer wall is a non-porous dense layer that is not limited by the issues that are present with porous ion conducting membranes. But unlike, the dense ion conducting membranes, there are numerous materials that are known to undergo intercalation reactions. This increases the number of electrochemical systems that can benefit from separating the reactions occurring at the anode or cathode.

The limitations with electrochemical transfer walls are the requirement of having an electron transfer accompany the ion transfer at the interface of the wall and first solution, the requirement of having a second electron transfer at the interface of the wall and second solution, and the limitation this forces on the current density for which the ion can be transferred across the wall (U.S. Pat. No. 8,449,747 B2, <5 mA/cm$^2$) or higher current densities through more elaborate cell design and setup (U.S. Publication No. 2013/0126354 A1). These limitations narrow the field of use for electrochemical transfer walls to applications that can tolerate low current densities and complicated electron transfer.

There is need for method and device that will permit the transfer of ions between two compartments of an electrochemical system at current densities found with porous ion conducting membranes, but with the benefits afforded by dense ion conducting membranes and with the ability to transport a diverse and large number of ions afforded by electrochemical transfer walls. There are numerous applications where this type of device could find use, such recycling industrial waste, recycling mining waste, removing metals from petroleum residuals, synthesizing different chemicals, removing ions from solution such as desalination.

BRIEF SUMMARY OF THE INVENTION

In accordance with the present invention, an electrochemical method and cell device is provided with a dense separation membrane comprising an intercalation material that transfers selected ions between two isolated compartments of an electrochemical cell. Unlike an electrochemical transfer wall or junction, for which the transfer of ions is achieved through an intercalation process involving an electron transfer at the wall or junction, the intercalation membrane disclosed herein uses the empty sites present in the host crystal structure of the intercalation material after the removal of the ions or atoms it intercalates as diffusion pathways for the ion transfer process. The disclosed intercalation membrane allows electrochemical processes to be operated at current densities greater than 25 mA/cm$^2$. Such a device will permit the transfer of ions to be conducted at current densities similar to porous polymer membranes and for which commercial electrochemical applications are often designed.

The disclosed intercalation membrane will also behave like a dense ion conducting membrane in that only metal or alkali metal cations will be transferred between a first medium and a second medium, separating the electrochemical reactions at the two electrodes in all other manners. The present invention is an improvement over dense ion conducting membranes because it enables the use of a large family of intercalation materials, increasing the number of ions that can be conducted, and expanding the number of electrochemical systems with which it can be used. The disclosed invention is also an improvement over electrochemical transfer walls due to the ease of integrating a membrane into electrochemical cells versus integrating an electrochemical transfer wall, and the higher current densities that can be achieved with the present membrane.

Intercalation materials are materials that can incorporate atoms or ions into a host structure upon the expansion of the host structure. [Lerf, A. Dalton Transactions, 2014, 43(27), 10276-10291] describes the host of intercalation materials as containing structural elements like chains, or layers that are held together by weak van der Waals force, or they have three dimensional (3D) framework structures containing channels and cavities. These chains layers or 3D framework have more unoccupied sites than standard materials and therefore have high mobility for the inserted species. Also, the weak van der Waals forces that are displaced during the intercalation permit the mobility of the inserted species at room temperature. In most cases the topological relationships between the host and final products are almost retained during the intercalation process and the degree of lattice expansion depends on the size and quantity of the inserted species. These materials have been extensively studied for their application to superconducting and energy storage applications.

The first application, the intercalation of guest ions or atoms into different structures, allows the electronic properties of the material to be tailored. In the second case, the reversible insertion of ions accompanied by electrons into a solid material provides a method for storing energy. While in the first case the reversibility and rate of intercalation are not important, in the second case the rate of intercalation is important as it is determines the power density that a battery can provide. For energy storage applications having high electrical conductivity is also important and most battery electrodes are made by casting a slurry of the intercalation material, conductive carbon and a polymer binder such as poly(vinyl difluoride) (PVdF). The high mobility of intercalation materials investigated for battery electrodes provide ion mobilities high enough to use these materials to transfer ions between two mediums that are separated by the intercalation material.

The use of intercalation materials to selectivity transfer ions from a first solution to a second solution has been demonstrated by U.S. Pat. No. 8,449,747 B2 and U.S. Publication No. 2013/0126354 A1. These patent references teach an electrochemical transfer wall or junction based on the well know intercalation material, Chevrel phase $Mo_6T_8$ (where T is S or Se), is used to show selective transfer of cations with like charges. As described in these examples the transfer of ions across the electrochemical transfer wall occurs in three steps. First there is an intercalation reaction at the surface of the electrochemical transfer wall and the first solution involving the transfer of an electron and an ion. Second the ion shuttles to the surface of electrochemical transfer wall and the second solution due to a concentration gradient established within the electrochemical transfer wall. Third the ion is deintercalated out of the electrochemical transfer wall along with an electron. In both U.S. Pat. No. 8,449,747 B2 and U.S. Publication No. 2013/0126354 A1 the electrochemical transfer wall is connected to an external circuit which is used to measure and or control the potential of the interfaces of the wall during the transfer of ions from the first solution to the second solution. In doing this the authors were able to show the transfer of Co, Ni, Cd, Zn, Mn ions through the Chevrel phase based electrochemical transfer wall.

In one embodiment disclosed herein, a membrane is used to separate the reactions occurring at two electrodes of an electrochemical cell in which at least one component of the membrane is an intercalation material. Such a membrane separates the electrochemical cell into two compartments for which the only communication is through the external electric circuit and ion or ions transferred through the membrane. This provides a method and device that improves the efficiency, selectivity, and sensitivity of the electrochemical cell, while permitting non-compatible environments to be used in the same electrochemical cell. In one embodiment of the present invention, the membrane is used in an electrochemical cell to remove ions from one medium and transfer the ions to a second medium. This type of cell can be used to recycle industrially important streams or chemicals, help in the remediation of waste streams, concentrate ions, reduce the salinity of a solution, remove unwanted metals or salts from different mediums, and detect different ions present.

In one embodiment the intercalation material is the Chevrel phase ($Mo_6T_8$, where T is S, Se, Te), which has a high mobility for a large variety of metallic and alkali earth metal ions. The Chevrel phase ($Mo_6X_8$, where X=S or Se) is a well-known material that has been investigated for applications ranging from cathode materials for Mg-ion batteries to superconducting materials. The material is made up from quasi-rigid $Mo_6X_8$ molecular units for which the 3-D packing leads to a system of channels along the rhombohedral axes. The channels then provide a means for the cations to intercalate into the material. Multivalent d-metal cations have unusually high mobility in the material. The mobility can be modified by replacing the $S^{2-}$ with $Se^{2-}$, thus allowing the material to optimized for different cations and applications. $Mo_6S_8$ as a separator that can selectivity conduct metal and alkali metal cations such as $Na^+$, $Li^+$, $K^+$, $Ca^{2+}$, and $Me^{2+}$. Contrary to an electrochemical transfer wall, the ion transfer conducted by the Chevrel phase in the presently disclosed invention is performed treating the material as a membrane isolated by any external electric current. As a membrane the host structure of the intercalation material permits the transfer of ions from a first medium to a second medium without the prerequisite of an accompanying electron transfer. Thus, the current density obtained during the transfer of ions from a first solution to a second solution is not limited by the electron transfer process at the interfaces of the membrane. One disclosed embodiment of the present invention uses an intercalation membrane to separate two compartments of an electrochemical flow cell, as shown in FIG. 2. In this embodiment the intercalation membrane transports $Na^+$, $Li^+$, $K^+$, $Mg^{2+}$, $Zn^{2+}$, $Pb^{2+}$, $Ce^{3+}$ and $Y^{3+}$ at current densities between 0.5 and 250 $mA/cm^2$.

The details of one or more embodiments of the disclosed invention are set forth in the accompanying drawings and the description below. Other advantages and aspects of the present invention will become apparent upon reading the following description of the drawings and detailed description of the invention.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and processes of the described invention, all of the described embodiments and examples are to be considered, in all respects, as illustrative only and not as being limiting in any manner.

Furthermore, the described features, structures, characteristics, processes, or methods of the invention may be combined in any suitable manner in one or more embodiments. In the following description, numerous specific details are provided, such as examples of suitable intercalation membranes, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, processes, or operations are not shown or described in detail to avoid obscuring aspects of the invention.

Some terms and their definitions that will be used throughout the description of the disclosed invention follows. An "electrochemical cell" will refer to any system or device for which chemical reactions are occurring at or in electrodes that are connected to an external circuit, such that the external circuit drives the chemical reactions at the electrodes or such that that chemical reactions at the electrodes drive current through the external circuit. "Membrane," herein will be used to describe a physical barrier that can be used to separate two electrodes of an electrochemical cell and permits at least one ion to be transferred from one compartment of an electrochemical cell to another compartment of an electrochemical cell. "Intercalation material," is defined as a material that can reversibly incorporate a guest ion or atoms into its structure. "Electrolyte" will be defined and used as a medium that conducts electrical current by the movement of ions present in the medium. "Electrochemical transfer wall" and "electrochemical transfer junction" will be used interchangeably, and will refer to a physical barrier that separates two compartments of an electrochemical cell and requires an electron transfer to accompany the transfer of ions through the material.

Figure 1:
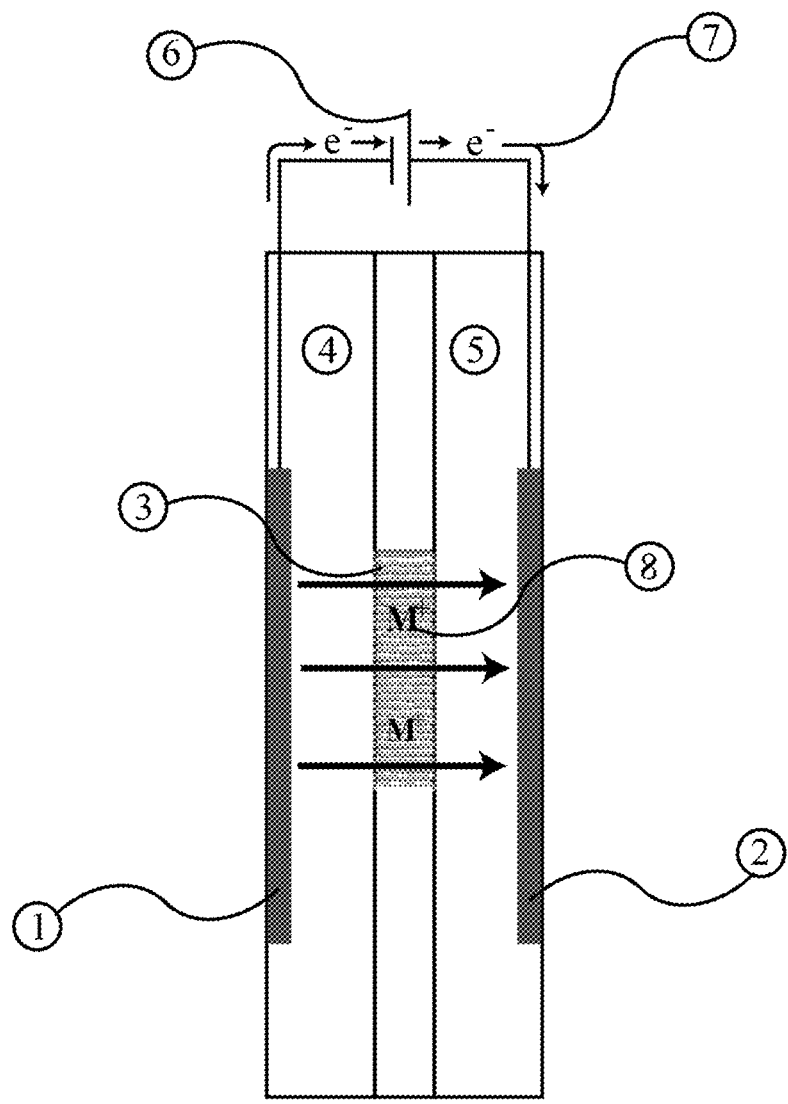
FIG. 1 is a schematic of the cross section showing the basic component of an electrochemical cell.

The present invention is generally directed to a method and a device that is used to transfer ions between two compartments of an electrochemical cell using a dense membrane which composition is such that at least one component is a material known as an intercalation material. A schematic that shows the basic components of an electrochemical cell with an intercalation membrane is shown in FIG. 1. In one embodiment the electrochemical cell has an anode 1 at which oxidation reactions occur, a cathode 2 at which reduction reactions occur, an intercalation membrane 3 which separates the medium 4 for which the oxidation reactions are occurring from the medium 5 for which the reduction reactions are occurring. Electrolytes are used in electrochemical cells to provide ion transport between the two electrodes. In electrochemical cells where the electrodes are separated by a barrier as in the present invention, the electrolyte for which the anode is in contact with is termed the anolyte and the electrolyte in contact with the cathode is termed the catholyte. The reactions at the two electrodes are caused by an external electric potential and current source 6 that creates an electric field between the electrodes. Alternatively, in the case of a galvanic cell, reactions at the two electrodes can produce an electric field that can do work external to the cell. In either case the electric field causes electrons 7 to flow through an external circuit and ions 8 to migrate through the electrochemical cell to maintain charge neutrality. Although shown as positive ions migrating through the cell in the same direction as the electrons, in another embodiment negative ions can migrate through the cell in the opposite direction as the electrons to maintain charge neutrality.

The present invention is applicable to a variety of different applications. Some non-limiting examples are electrolysis, reclamation, electro-wining, recovery, recycling, valorization, energy storage, and sensors. As expected, the cell design for each one of these applications is different and one could imagine numerous possible designs for each application. Referring to FIG. 1, one could imagine that the components of the electrochemical cell can be optimized for the type of medium with which the electrodes contact, such as, for example, aqueous solutions, organic solutions, molten salts, room temperature molten salts or ionic liquids (IL), gases or steam, and super critical systems. It is also known to those skilled in the art that the size and shape of the electrochemical cell and its components will depend on the system and application. In some embodiments the cell is used in a batch type mode and the cell is designed to hold a specific quantity of electrolyte. In some embodiment the cell is used in a continuous flow mode and the cell is optimized in consideration of the mass transport of electrolyte through the cell. Other aspects that can affect cell design are product buildup and removal, electrode composition, position and size, and requirements specific to the application.

Figure 2:
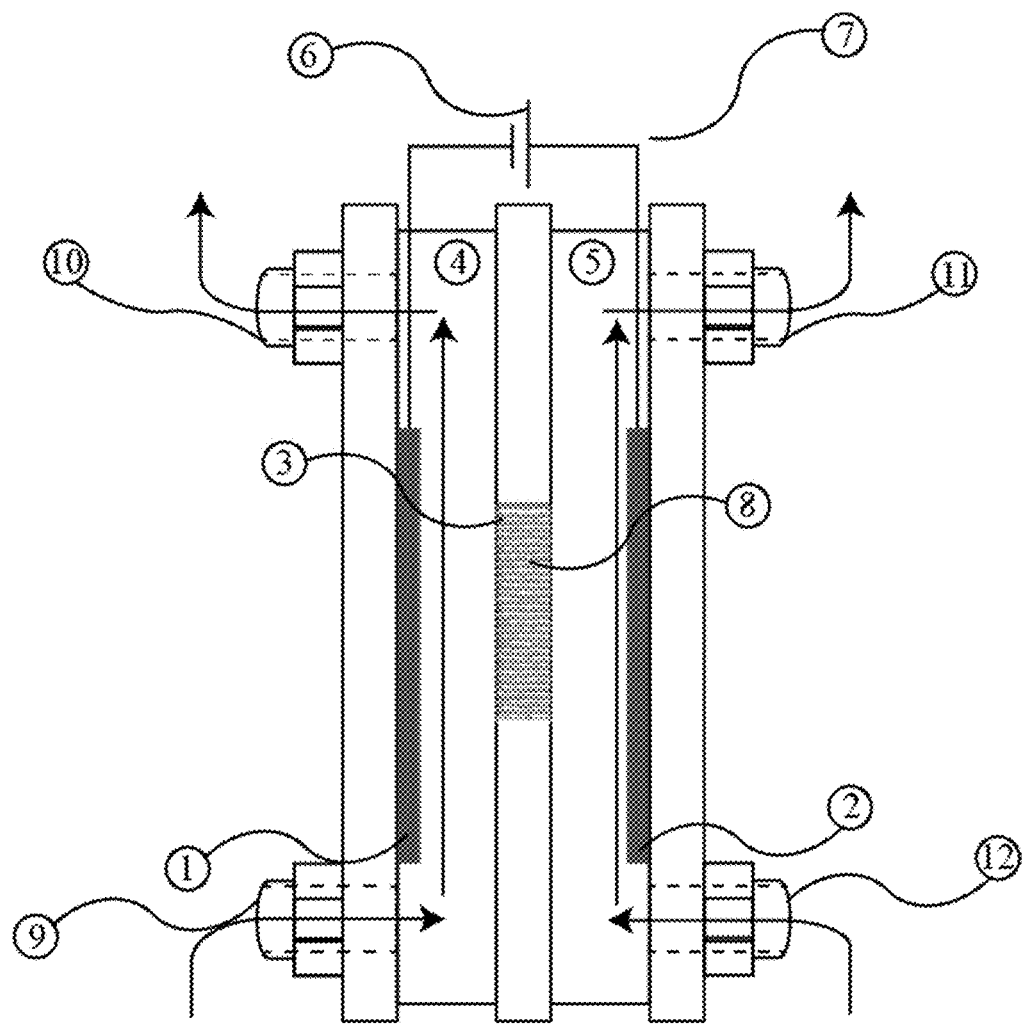
FIG. 2 is a schematic of the cross section of an electrochemical flow cell.

In one embodiment of the presently disclosed invention, the intercalation membrane is used to separate the anode and cathode of a micro flow cell as schematically represented in FIG. 2. This cell has the basic components described for FIG. 1, except there are two ports on the anolyte chamber, one for introducing anolyte to the chamber 9 and one for removing anolyte from the chamber 10. Similarly, there are two ports on the catholyte chamber, one for introducing the catholyte 12 and one for removing the catholyte 11. The flow of the electrolytes into and out of the electrochemical cell shown in FIG. 2 can be controlled using pumps or other fluid transport means which can cause the electrolyte medium to flow. This type of cell allows the distance between the electrodes and intercalation membrane to be small while still processing high volumes of material. In such a cell the products of the reactions occurring at the anode and cathode are carried away by the flow of the electrolyte, while fresh reactant is constantly delivered to the electrode surface. This type of flow cell is beneficial for electrochemical reactions in which the electrolyte is liquid or gaseous.

In one embodiment the electrolytes are cycled between the electrochemical cell and a reservoir (not shown) for each of the anolyte and catholyte allowing the electrochemical reaction to occur until a specific quantity of charge has passed. In some embodiments the electrolyte can pass through multiple reservoirs before cycling back into the electrochemical cell. The reservoirs can be used to collect different components of the electrolyte, conduct separate chemical reactions or to change the properties of the electrolyte, for example heating or cooling the electrolyte. In another embodiment the electrolytes are passed through the electrochemical cell in a single pass, without any dedicated reservoirs for the electrochemical process. It is within the scope of the disclosed invention to provide multiple electrochemical cells arrange in series and or parallel in which the electrolyte flows through in either a single pass or until a specific quantity of charge has passed, otherwise in continuous or batch mode. It should be clear to those skilled in the art that the disclosed invention is not dependent on the method of electrolyte flow or storage.

The intercalation membrane disclosed in the present invention is a dense material in which at least one component is an intercalation compound. Accordingly the intercalation compound is a compound that has a reversible uptake of ions, either cations or anions at low temperatures (a temperature in the range of 0 to 150° C.) while the structure of the host lattice is conserved. In some embodiments the intercalation compound is chosen from the dichalcogenides, graphite, oxides, phosphates, Chevrel phase, perovskites and silicates. Some non-limiting examples of intercalation compounds with and without the guest ion are $MoS_2$, $MoSe_2$, $MoTe_2$, $WS_2$, $WSe_2$, $Mo_6S_8$, $Mo_6Se_8$, Mo6Te8, $Li_xCoO_2$, $LixMn_2O_4$, $LixV_3O_8$, $Li_xNiO_2$ or $Li_xMnO_2$, $Li_xFePO_4$, $VOPO_4$, $Na_xFeFe(CN)_6$, $Na_xCrO_2$, P2-$Na_x[Fe_{1/2}Mn_{1/2}]O_2$, O3-$Na[Ni_{1/3}Fe_{1/3}Mn_{1/3}]O2$, $Na_xFePO_4CO_3$, $Na_xV_2O_2(PO_4)_2F$, $Mg_{1.03}Mn_{0.97}SiO_4$, $MgFeSi_4$, $MgCoSiO_4$, $CaSi_2$, and $RuO_2$. The value of "x" identified in the foregoing compounds is different, but for the purpose of providing a general, but non-limiting parameter, x is typically in the range from 0 to 3. The choice of intercalation compound for the membrane depends on the ion that needs to be transferred for the electrochemical reactions being conducted by the cell and the stability of the intercalation compound to the media it is exposed to on both surfaces of the membrane. Other factors can also be taken into account for the selection of the intercalation compounds, such as physical properties, ion and electron conductivity, cost of production and ease of fabrication.

In one embodiment the intercalation compound is chosen to transport Li-ions across the intercalation membrane. Compounds known to intercalate Li-ions from the extensive work on Li-ion batteries can be used. Some non-limiting examples are $Li_xCoO_2$, $Li_xMn_2O_4$, $Li_xV_3O_8$, $Li_xNiO_2$ or $Li_xMnO_2$, and $Li_xFePO_4$. In another embodiment the intercalation compound is chosen to transport Na-ions across the intercalation membrane. Compounds known to intercalate Na-ions are used. Some non-limiting examples are $VOPO_4$, $Na_xFeFe(CN)_6$, $Na_xCrO_2$, P2-$Na_x[Fe_{1/2}Mn_{1/2}]O_2$, O3-Na$[Ni_{1/3}Fe_{1/3}Mn_{1/3}]O_2$, $Na_xFePO_4CO_3$, and $Na_xV_2O_2(PO_4)_2F$. In another embodiment the intercalation compound is chosen to transport Mg-ions across the intercalation membrane. Compound known to intercalate Mg-ions are used. Some non-limiting examples include $Mg_{1.03}Mn_{0.97}SiO_4$, $MgFeSiO_4$, and $MgCoSiO_4$. In the above mentioned embodiments specific ions were targeted for transport across the membrane.

Yet in other embodiments, the intercalation compound is chosen to transport numerous metal or alkali metal ions across the membrane, including, but not limited to, ions of Li, Na, K, Mg, Pb, Zn, Y, and Cs. In one embodiment an intercalation compound like $Mo_6S_8$ is used to conduct multiple cations. In one embodiment the electrochemical cell is operated in a method that transports the ions without preference to a specific ion, in another embodiment the electrochemical cell is operated that preferentially transports certain ions over other ions. Further still, in another embodiment multiple cells or compartments within a single cell are used to separate different ions being transferred through the intercalation membrane.

According to the disclosed invention the intercalation membrane is composed of at least one intercalation compound. In one embodiment the membrane is composed of a single material, which is the intercalation compound. In such an embodiment the intercalation membrane can be formed with or without the guest species present. For a non-limiting example, the membrane can be made using $LiMn_2O_4$, or $Mn_2O_4$. In another embodiment the membrane is composed of solely $Mo_6S_8$ and is formed as $Cu_2Mo_6S_8$ or as $Mo_6S_8$. In either of these examples the guest species can be removed either chemically or electrochemically once the membrane is formed, or prior to forming the membrane. The formation of the single material intercalation membrane can be performed using standard solid state processing techniques which will depend on the intercalation material being implemented. To fully exploit the benefits of using an intercalation membrane the membrane is fabricated in a manner that produces a membrane with a density of at least 90% or more preferably at least 98%. In this context membrane density describes the amount of void space or lack of void space present in the membrane. A membrane density of 100% would have no void space present in the membrane.

In another embodiment the intercalation membrane is composed of an intercalation compound and at least one additional compound. The additional compounds can be inorganic or organic and can in themselves be able to transport ions through macro/nano-scopic pores or through their crystal structure or grain boundaries. In one embodiment at least one of the additional compounds is also an intercalation compound. In another embodiment at least one of the additional compounds is not able to transport ions. In one embodiment the additional compounds are added to improve the mechanical, chemical, thermal, transport or electrical properties of the membrane specific for the application it is being used. The addition compounds can also be added to improve the production of the membrane by reducing processing difficulties, permitting forms that cannot be obtained with the intercalation material, and by reducing the cost of producing the intercalation membrane.

In one embodiment, the intercalation membrane is between 10 and 5000 microns thick, or more preferably between 10 and 200 microns thick, or even more preferably the membrane is between 50 and 100 microns thick. In one embodiment, the membrane is in planar form as a rectangle, disk, or other planar geometries that conform to the electrochemical cell design. In other embodiment, the membrane is in the form of a cylinder or cube. The geometry of the intercalation membrane can thus be modified for electrochemical cells with a variety of configurations. For non-limiting examples the intercalation membrane can be designed to be used in parallel plate electrochemical cells or in tubular electrochemical cells. It should be clear to one skilled in the art, the process and intercalation membrane can be applied in a variety of cell designs.

In one embodiment the intercalation membrane 3 is fabricated with a support structure. The support can be fabricated out of ceramic, plastic, or other materials chosen specifically for their mechanical and chemical stability. The support structure can be made out of a solid material in a form with void spaces that permits flow, or the support structure can be a porous material. The intercalation membrane can be fabricated in a manner that makes it amendable to be assembled with the support structure after the membrane has been fabricated. In another embodiment the intercalation membrane is formed directly on the support structure for example through the any of the different thin films processing techniques. The intercalation membrane and support structure can be combined at any point of the fabrication process based on the process required to form both components. In another embodiment, the intercalation membrane can be formed such that there are microchannels within the macrostructure of the membrane.

The anode 1 can comprise of any suitable material that allows oxidation reactions to occur in the anolyte compartment when an electrical field is applied between the anode and cathode. Some non-limiting examples of anode materials include, but are not limited to, platinum, titanium, nickel, cobalt, iron, stainless steel, lead dioxide, metal alloys, combination thereof, and other known or novel anode materials. In one embodiment, the anode may comprise iron-nickel alloys such as KOVAR® or INVAR®. In other embodiments, the anode may comprise carbon based electrodes such as boron doped diamond, glassy carbon and synthetic carbon. Additionally, in some embodiments the anode comprises a dimensionally stable anode (DSA), which may include, but is not limited to, rhenium dioxide and tantalum pentoxide on a titanium substrate.

The cathode 2 may also be fabricated of any suitable cathode material that allows the reduction reaction to occur without any significant degradation. The cathode may comprise the same or different materials used for the anode. Some non-limiting examples of suitable cathode materials include without limitation, nickel, stainless steel, graphite, and any other suitable cathode materials that is known or novel.

In one embodiment, the electrodes have a smooth morphology such as a foil or thin film. In another embodiment, the anode and cathode have a high surface area morphology, for examples but not limited to, a foam, grit, or other porous structure. In one embodiment, the anode and cathode have the same morphology, while in another embodiment, electrodes have a different morphology. The distance between the intercalation membrane and the electrodes is optimized for the reactions and cell type. In some embodiments the electrodes are in physical contact with the intercalation membrane, in some cases the electrodes can be formed directly on the membrane.

In one embodiment the electrolyte medium is gas or steam. In some embodiments the electrolyte medium may be a super critical gas, such as super critical steam or supercritical $CO_2$. In another embodiment one side of the intercalation membrane is in direct contact with a molten metal such as molten sodium. In another embodiment the electrolyte medium comprises one or more molten salts. Yet in another embodiment the electrolyte medium is an ionic liquid that is liquid between 0-250° C. In some embodiments the electrolyte medium is a conventional solvent compatible with the electrochemical cell components and which is liquid between −25-125° C.

In one embodiment the anolyte and catholyte medium are the same and are maintained at similar conditions, such as temperature and pressure. Yet in another embodiment the medium of the anolyte and catholyte are different and or the conditions of the electrolytes are different. This is possible because the intercalation membrane isolates the compartments from each other in every way besides the conduction of ions. Thus, the anolyte and catholyte may be separately selected specifically for the reactions that occur in each compartment and/or the solubility of the chemicals required for the specific reactions. It should be clear to one skilled in the art, that the electrolyte composition is application specific. It is a parameter that may be optimized for electrochemical cell reactions, but the electrolyte composition does not enable any particular aspect of the ion transfer across the intercalation membrane.

The electrolyte medium may comprise a liquid solvent or a mixture of solvents. In one embodiment the mixture contains at least one organic solvent. In another embodiment at least one solvent is water. At least one component of the solvent is a polar solvent and some non-limiting examples include with-out limitation, water, methanol, ethanol, isopropanol, n-propanol, acetone, acetonitrile, dioxane, butanol, DMSO, $CS_2$, diethyl carbonate, ethylene carbonate, glycerol, and ionic liquids. In some embodiments at least one component of the anolyte is a non-polar solvent for some non-limiting examples are, hexane, cyclohexane, pentadecane, petroleum ethers, and dodecane. The solvent or solvent mixture will depend on the application of the electrochemical cell, solubility of the reactants and products of the electrochemical reaction occurring at the electrodes, physical properties such as melting and boiling point, conductivity, and compatibility with electrodes and intercalation membrane.

In on embodiment the catholyte and anolyte are comprised of water and a salt of a metal, alkali metal or a rare earth metal. The salt concentration is between 0.1-50% by weight, or more preferably between 5-25% by weight, or most preferably between 7-15% by weight. Another embodiment the anolyte is comprised of waste water, a natural source of water, or another system from which the removal of ions is desired. In such an embodiment the anolyte salt concentration will be determined by the source of the water. In another embodiment the salt concentration of the anolyte is adjusted from the concentration found in the source using specific, non-toxic salts to improve the conductivity of the electrolyte.

When an electric potential is applied across the electrochemical cell an oxidation reaction occurs at the anode and a reduction reaction occurs at the cathode. One non-limiting examples is the oxidation and reduction of water producing $H_3O^+$ and $O_2$ at the anode and $H_2$ and $OH^-$ at the cathode. As the electrons flow through the external circuit from the oxidation reaction to the reduction reaction, cations are transported from the anode to the cathode to maintain charge balance. In the disclosed invention, the cations travel through the anolyte to the intercalation membrane where they are transferred to the catholyte, after which they travel to the cathode. Using the non-limiting example of splitting water, the cations then combine with the $OH^-$ and form hydroxides.

Several examples will be given to demonstrate the technical feasibility of using an intercalation membrane to separate the reactions that are occurring at the electrodes of an electrochemical cell. These examples demonstrate the advantage of using a membrane based on intercalation materials over porous polymer membranes, dense ceramic ion conducting membranes and electrochemical transfer walls/junctions. These are given by way of example only, and it is understood that the following examples are not comprehensive or exhaustive of the many types of embodiments of the present invention that can be prepared in accordance with the present invention.

EXAMPLES

The examples disclosed herein, used an experimental setup which consisted of a micro flow cell similar to the structure shown in FIG. 2, allowing both the anolyte and catholyte to be pumped through the cell while minimizing the distance between the electrodes and the membrane. The membranes used in the examples consisted of 2.54 cm diameter disks less than 1 mm thickness that were housed on scaffolds in the center of the cells. The disks were made by creating a slurry of $Cu_2Mo_6S_8$ (NIPPON) and BUTVAR® (Eastman) with a 50 vol % ratio of each and casting the slurry using a doctor blade. Following the casting, the slurry was allowed to dry overnight creating polymer composite intercalation membranes. As the scaffold and membrane physically separate the anode and cathode compartments, there was a separate reservoir and temperature controlled hotplate for the anolyte and catholyte. This allowed the chemistry and conditions of each electrolyte to be optimized for the respective electrode reactions. The anode consisted of platinum foil and the cathode consisted of nickel foil, each surface area significantly larger than that of the membrane. A multiple-head peristaltic pump was used to pump both electrolytes into the electrolysis cell. The tubing between the cell, pump, and reservoir was insulated for temperature sensitive electrolytes.

The anolyte that contained the sulfate salt of the different cations tested, and were made by dissolving at least 10% of the salt into deionized (DI) water. The catholyte was made in the same fashion as the anolyte and inductively coupled plasma (ICP) analysis was used to determine the pre and post electrolysis ion concentrations.

A power supply was connected and a current density between 10 and 100 mA/cm$^2$ was applied. During electrolysis, the voltage and current were monitored using a Data Acquisition Unit (Agilent 3490A) controlled by LabVIEW software. The applied current density caused oxidation to occur at the anode (smooth platinum) and reduction to occur at the cathode (nickel), with each electrode having a surface area of 11 cm$^2$. As the power supply transported electrons from the anode to the cathode, a charge balance was be maintained across the cell by the diffusion of positively charged ions. Given the dense nature of the intercalation membrane, the metallic or alkali earth ions are the only species that can provide this balance.

The ICP data and the quantity of charged passed during the electrolysis were used to determine the transfer efficiency for the different systems describe in the following examples. Details pertaining to the specific examples will be given below.

Example 1

Figure 3:
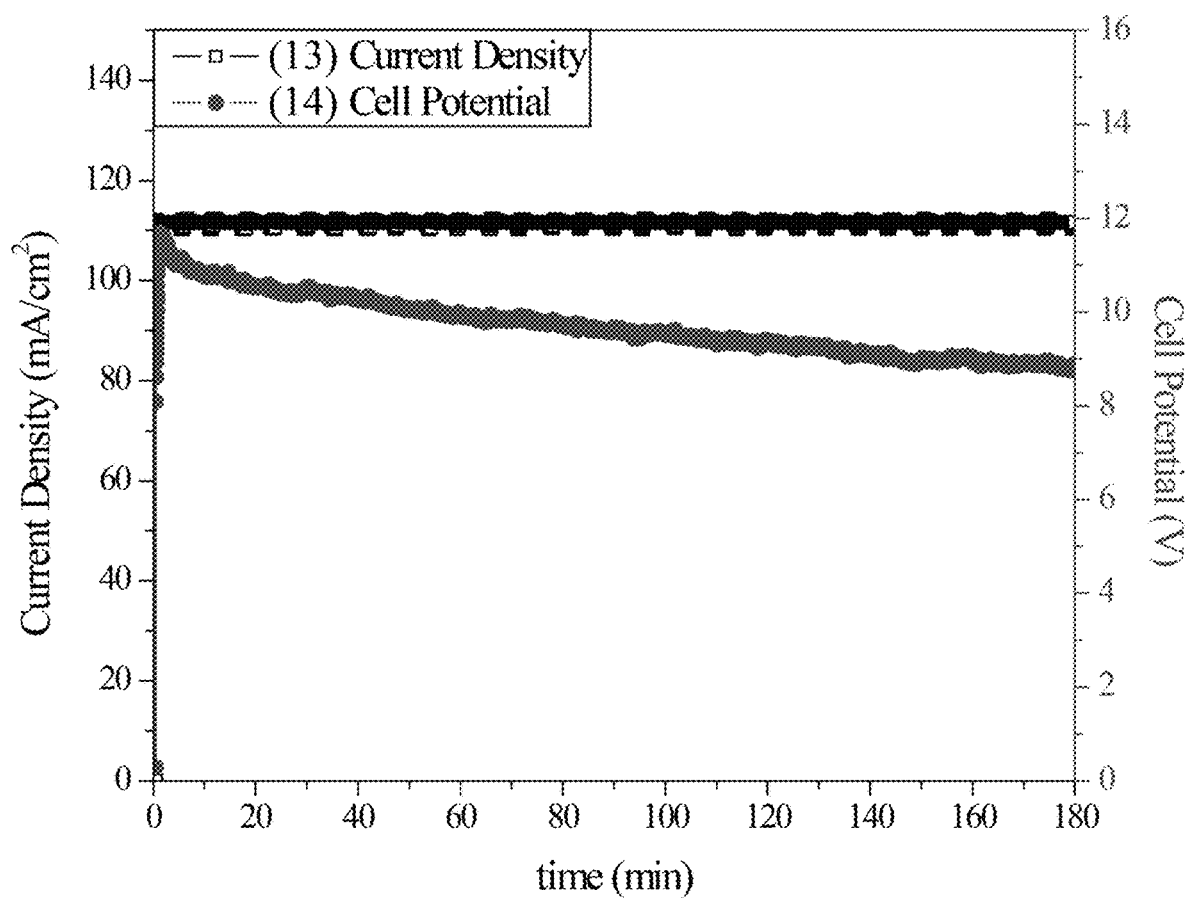
FIG. 3 is the voltage and current transients of the transfer of Na-ions through the intercalation membrane at a single current density.
Figure 4:
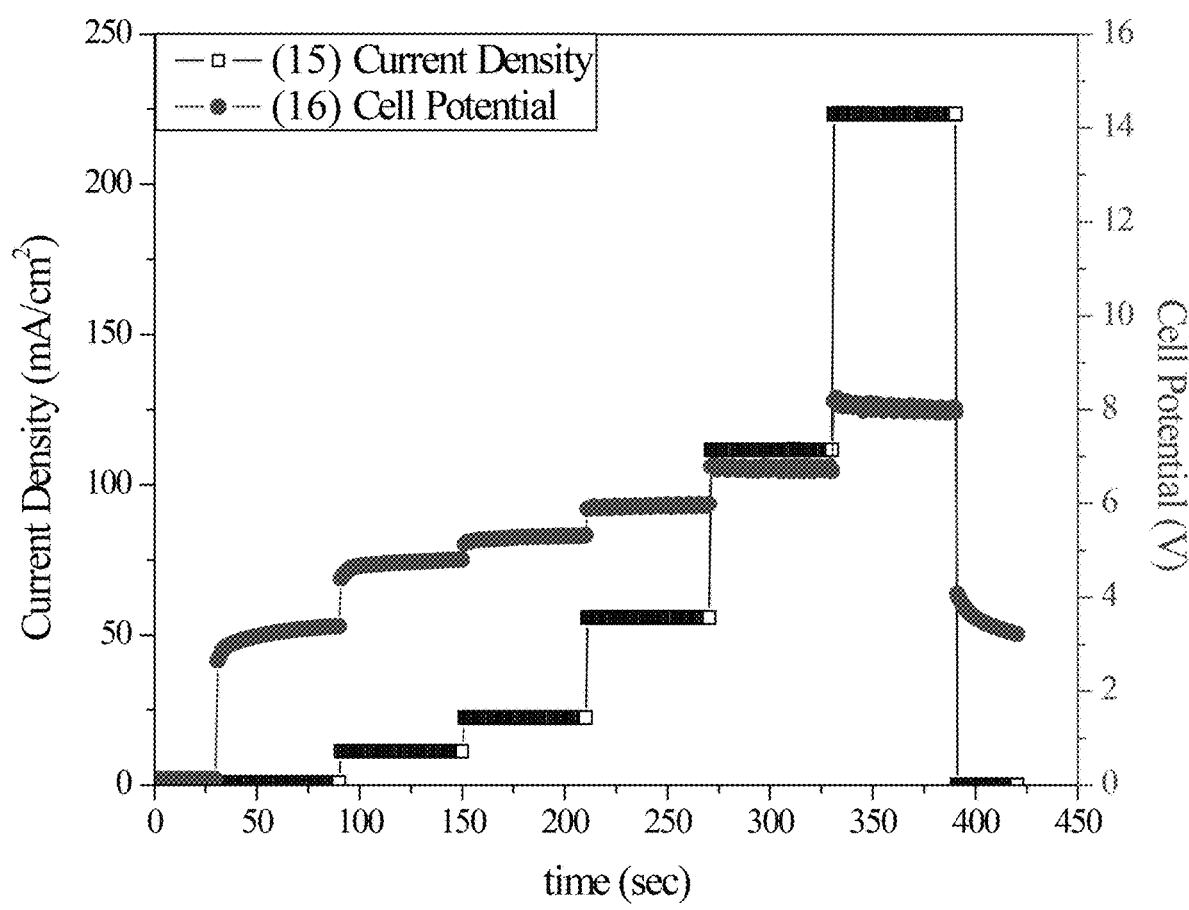
FIG. 4 is the voltage and current transients of the transfer of Na-ions through the intercalation membrane at different current densities.

An intercalation membrane was used to transfer ions from a first medium to a second medium. Na-ions were transferred from an aqueous solution of sodium sulfate in contact with the anode through an intercalation membrane and to an aqueous solution also containing sodium sulfate. The electrolytes were both made to contain 10 wt % $Na_2SO_4$ making an aqueous solution with a pH between 9 and 10. The temperature of the electrolytes was unchanged, remaining at room temperature for the duration of the experiments. Two different experiments were conducted with the system. The first consisted of a current density step experiment, where the current density was stepped up starting at 0.5 mA/cm$^2$ to 250 mA/cm$^2$ holding each step for 60 s. The second experiment was a bulk electrolysis experiment, in which the current density was maintained at 110 mA/cm$^2$ for the duration of the experiment. The current 13, 15 and potential 14, 16 transients of these experiments can be seen in FIGS. 3 and 4. It can be seen in FIG. 4 that during the step test the cell potential increased from 4 to 8 V as the current density was increased from 0.5 to 250 mA/cm$^2$. During the bulk electrolysis at 110 mA/cm$^2$ shown in FIG. 3 the cell potential started at 12 V and slowly decreased to 9 V during the 3 h duration of the experiment. Following the experiment the pH of the anolyte was 2 and the pH of the catholyte was 12. These solutions were allowed to cycle in the electrochemical cell for 12 h, after which the pH was measured and found to be unchanged. Comparing the charge transferred according to the number of coulombs passed during the experiment to the change in Na-ion concentration of the anolyte and catholyte, determined by ICP analysis, a Coulombic efficiency of over 90% was obtained.

Example 2

Figure 5:
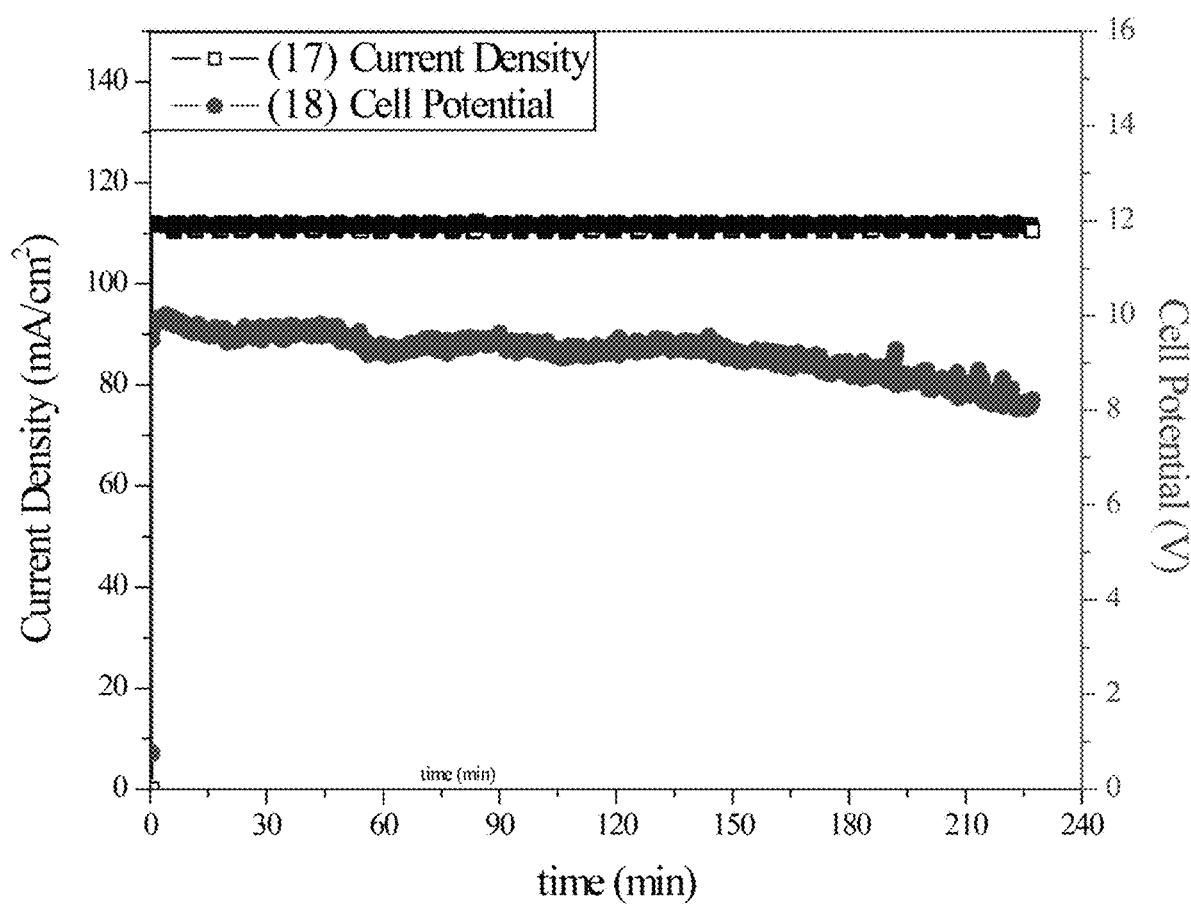
FIG. 5 is the voltage and current transients of the transfer of Li-ions through the intercalation membrane at a single current density.
Figure 6:
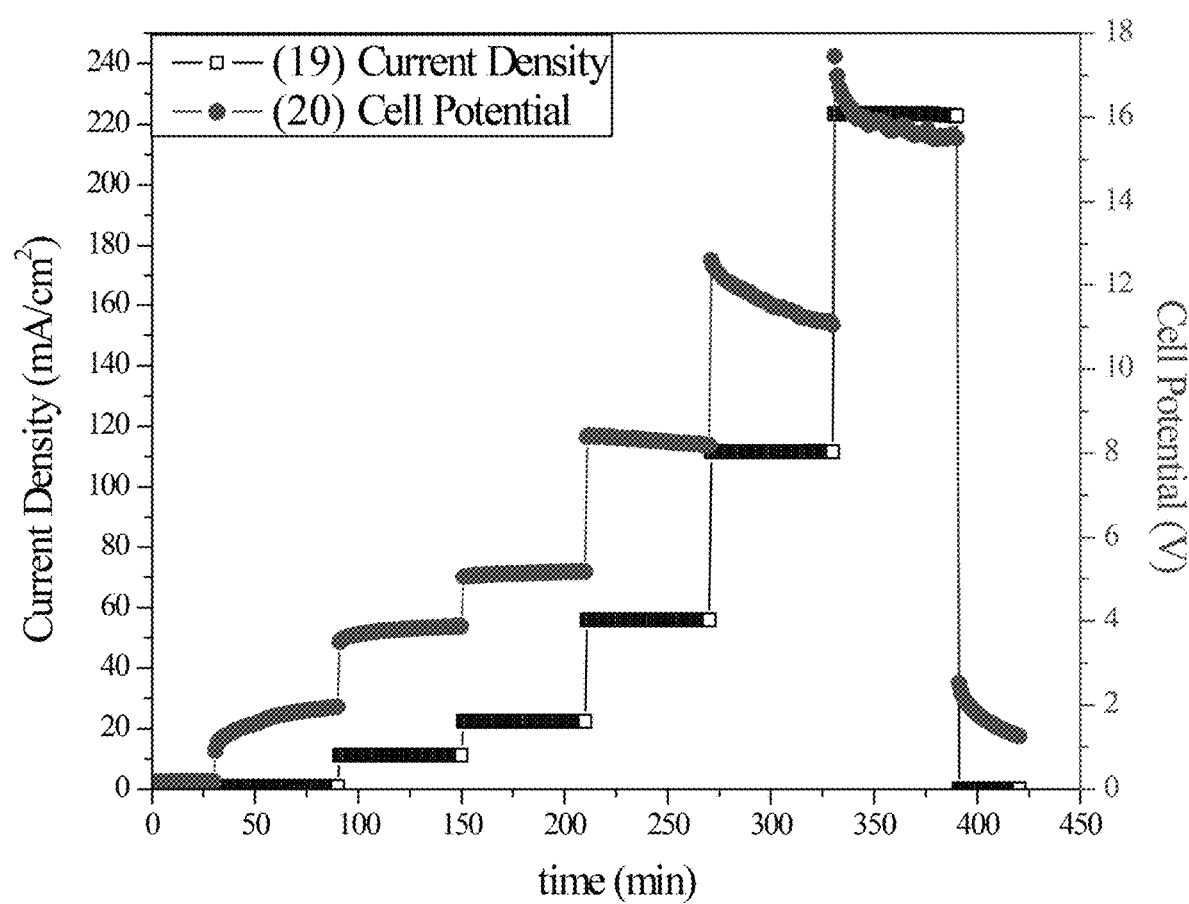
FIG. 6 is the voltage and current transients of the transfer of Li-ions through the intercalation membrane at a multiple current densities.

An intercalation membrane was used to transfer ions from a first medium to a second medium. Li-ions were transferred from an aqueous solution of lithium sulfate in contact with the anode through an intercalation membrane and to an aqueous solution also containing lithium sulfate. The electrolytes were both made to contain 10 wt % $Li_2SO_4$ making an aqueous solution with a pH between 9 and 10. The temperature of the electrolytes was unchanged, remaining at room temperature for the duration of the experiments. Two different experiments were conducted with the system. The first consisted of a current density step experiment, where the current density was stepped up starting at 0.5 mA/cm$^2$ to 250 mA/cm$^2$ holding each step for 60 s. The second experiment was a bulk electrolysis experiment, in which the current density was maintained at 110 mA/cm$^2$ for the duration of the experiment. The current 17, 19 and potential 18, 20 transients of these experiments can be seen in FIGS. 5 and 6. It can be seen in FIG. 6 that during the step test the cell potential increased from 2 to 15 V as the current density was increased from 0.5 to 250 mA/cm$^2$. During the bulk electrolysis at 110 mA/cm$^2$ shown in FIG. 5 the cell potential started at 10 V and slowly decreased to 8 V during the 4 h duration of the experiment. Comparing the charge transferred according to the number of coulombs passed during the experiment to the change in Li-ion concentration of the anolyte and catholyte, determined by ICP analysis, a Coulombic efficiency of over 92% was obtained.

Example 3

Figure 7:
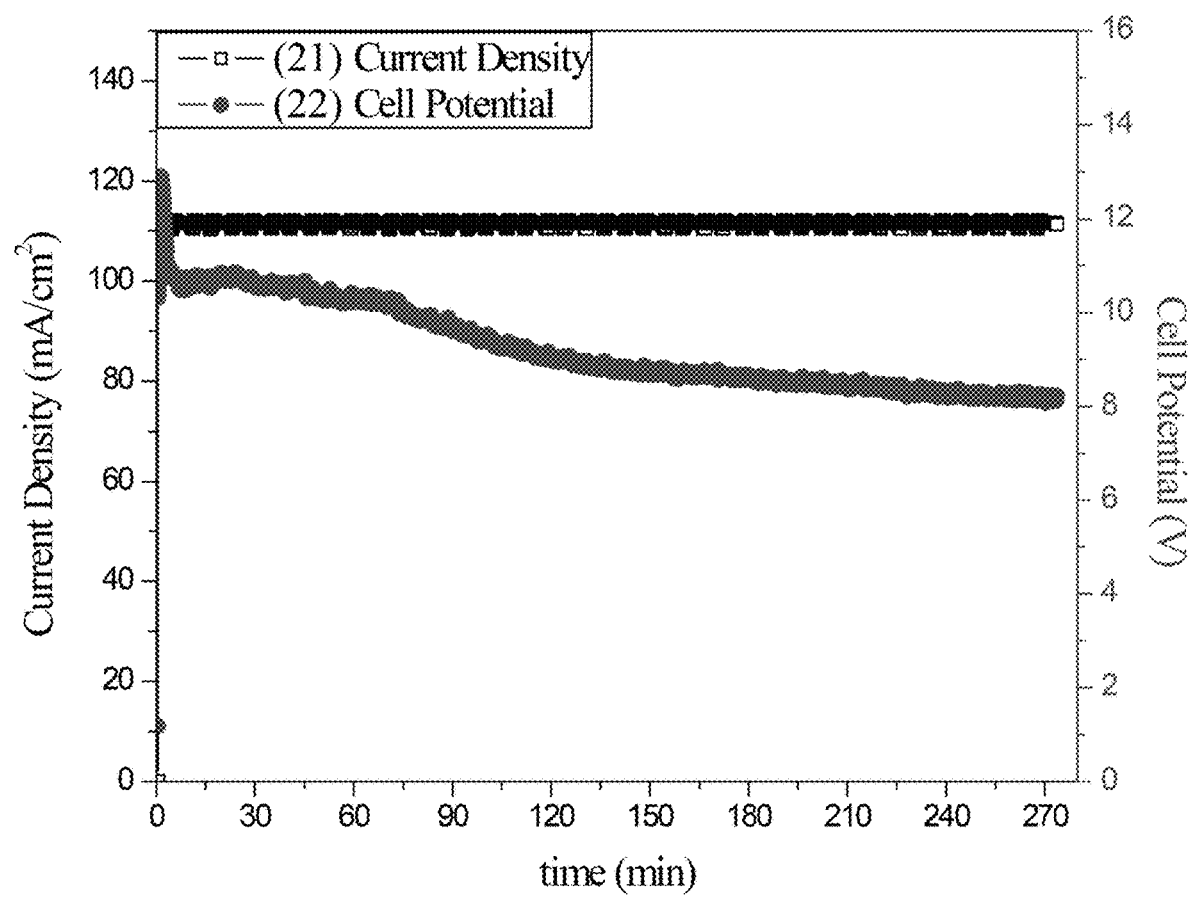
FIG. 7 is the voltage and current transients of the transfer of Mg-ions through the intercalation membrane at a single current density.
Figure 8:
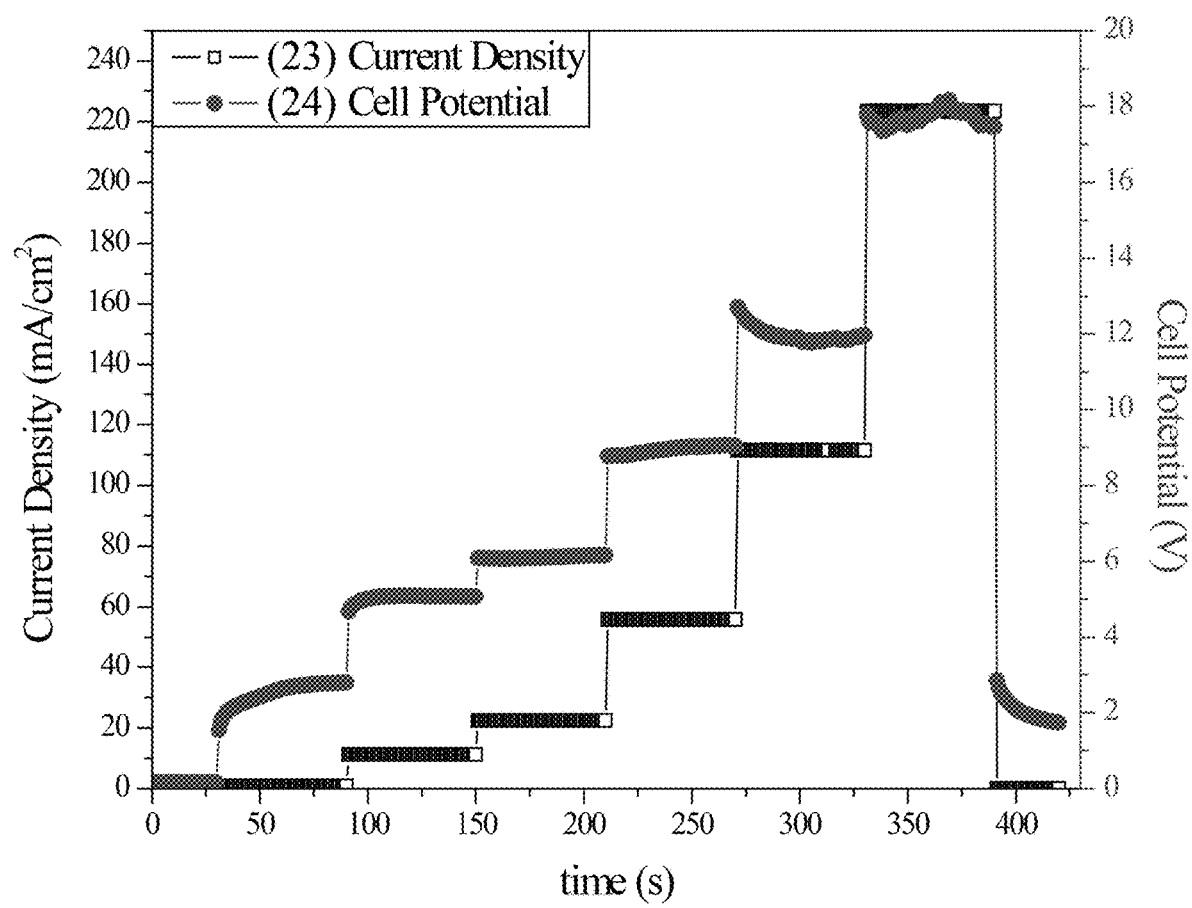
FIG. 8 is the voltage and current transients of the transfer of Mg-ions through the intercalation membrane at multiple current densities.

An intercalation membrane was used to transfer ions from a first medium to a second medium. Mg-ions were transferred from an aqueous solution of magnesium sulfate in contact with the anode through an intercalation membrane and to an aqueous solution also containing magnesium sulfate. The electrolytes were both made to contain 10 wt % $MgSO_4$ making an aqueous solution with a pH between 9 and 10. The temperature of the electrolytes was unchanged, remaining at room temperature for the duration of the experiments. Two different experiments were conducted with the system. The first consisted of a current density step experiment, where the current density was stepped up starting at 0.5 mA/cm$^2$ to 250 mA/cm$^2$ holding each step for 60 s. The second experiment was a bulk electrolysis experiment, in which the current density was maintained at 110 mA/cm$^2$ for the duration of the experiment. The current 21, 23 and potential 22, 24 transients of these experiments can be seen in FIGS. 7 and 8. It can be seen in FIG. 8 that during the step test the cell potential increased from 3 to 18 V as the current density was increased from 0.5 to 250 mA/cm$^2$. During the bulk electrolysis at 110 mA/cm$^2$ shown in FIG. 7 the cell potential started at 12 V and slowly decreased to 8 V during the 4 h duration of the experiment. Comparing the charge transferred according to the number of coulombs passed during the experiment to the change in Mg-ion concentration of the anolyte and catholyte, determined by ICP analysis, a Coulombic efficiency of over 91% was obtained.

Example 4

Figure 9:
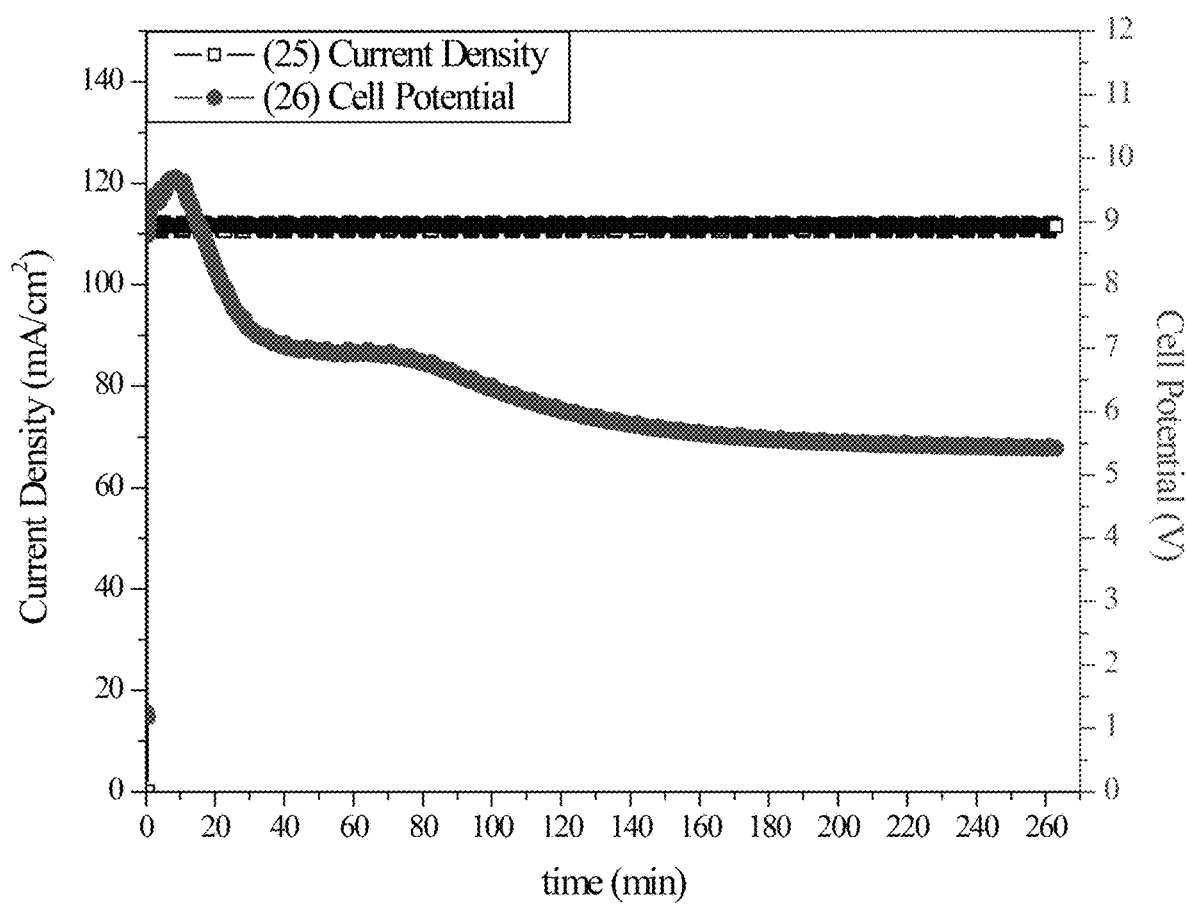
FIG. 9 is the voltage and current transients of the transfer of K-ions through the intercalation membrane at a single current density.
Figure 10:
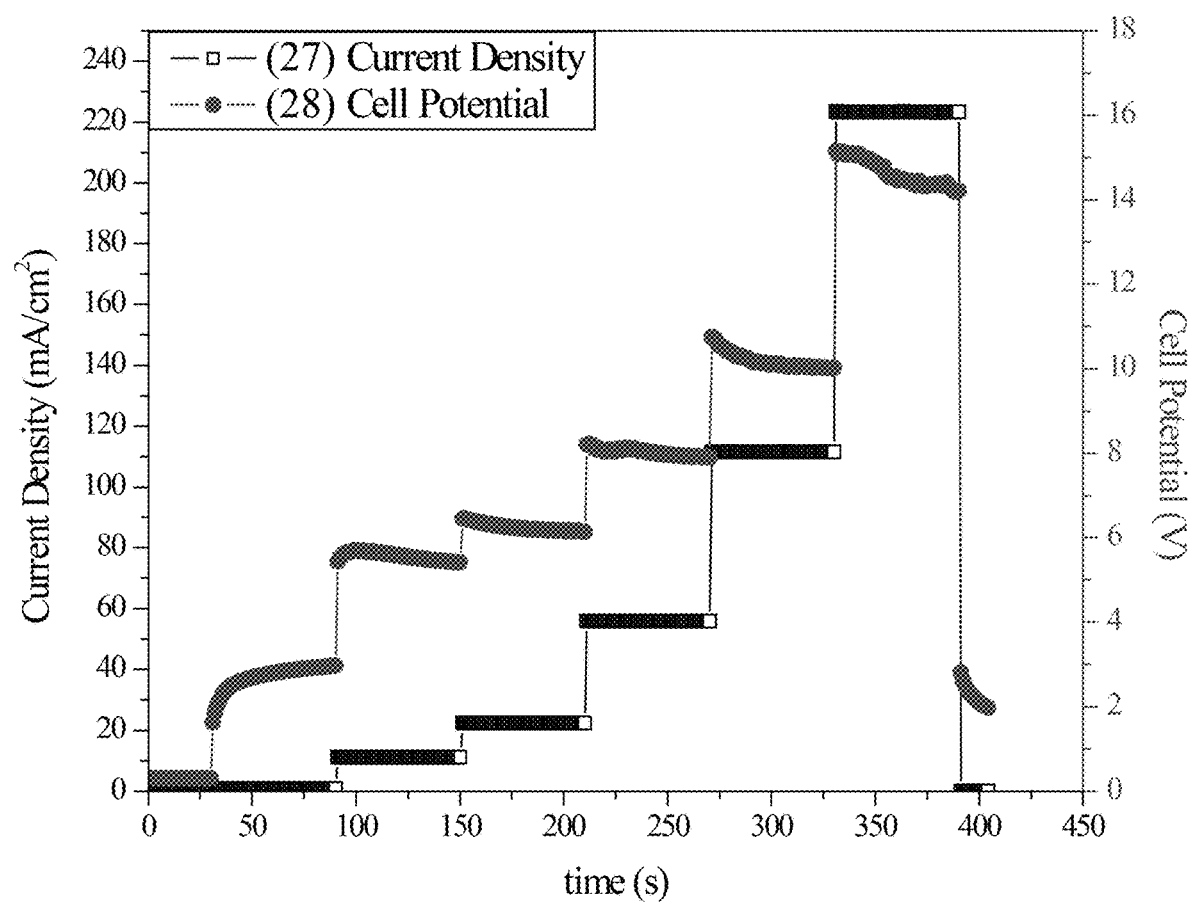
FIG. 10 is the voltage and current transients of the transfer of K-ions through the intercalation membrane at multiple current densities.

An intercalation membrane was used to transfer ions from a first medium to a second medium. K-ions were transferred from an aqueous solution of potassium sulfate in contact with the anode through an intercalation membrane and to an aqueous solution also containing potassium sulfate. The electrolytes were both made to contain 10 wt % $K_2SO_4$ making an aqueous solution with a pH between 9 and 10. The temperature of the electrolytes was unchanged, remaining at room temperature for the duration of the experiments. Two different experiments were conducted with the system. The first consisted of a current density step experiment, where the current density was stepped up starting at 0.5 mA/cm² to 250 mA/cm² holding each step for 60 s. The second experiment was a bulk electrolysis experiment, in which the current density was maintained at 110 mA/cm² for the duration of the experiment. The current 25, 27 and potential 26, 28 transients of these experiments can be seen in FIGS. 9 and 10. It can be seen in FIG. 10 that during the step test the cell potential increased from 4 to 15 V as the current density was increased from 0.5 to 250 mA/cm². During the bulk electrolysis at 110 mA/cm² shown in FIG. 9 the cell potential started at 9 V and slowly decreased to 5.5 V during the 4 h duration of the experiment. Comparing the charge transferred according to the number of coulombs passed during the experiment to the change in K-ion concentration of the anolyte and catholyte, determined by ICP analysis, a Coulombic efficiency of over 98% was obtained.

Example 5

Figure 11:
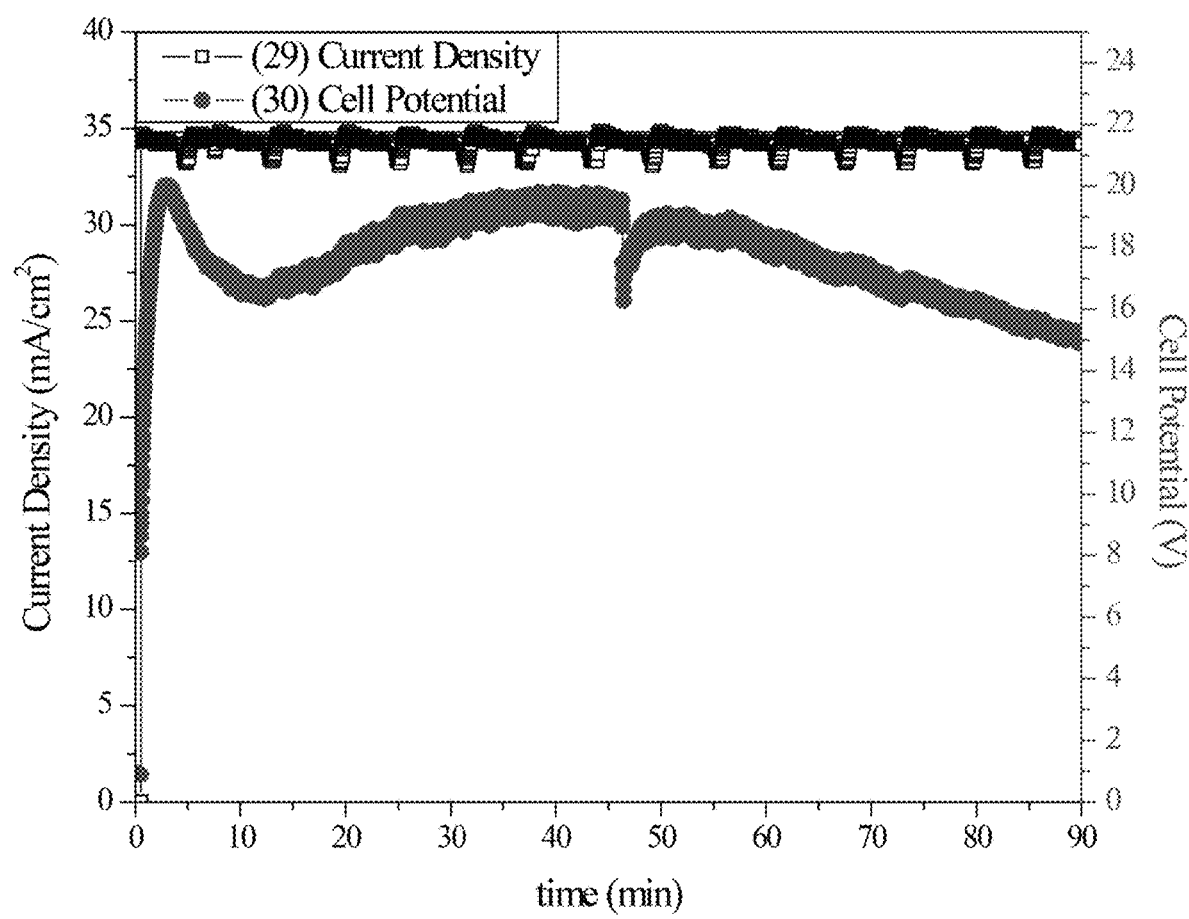
FIG. 11 is the voltage and current transients of the transfer of Zn-ions through the intercalation membrane at a single current density.
Figure 12:
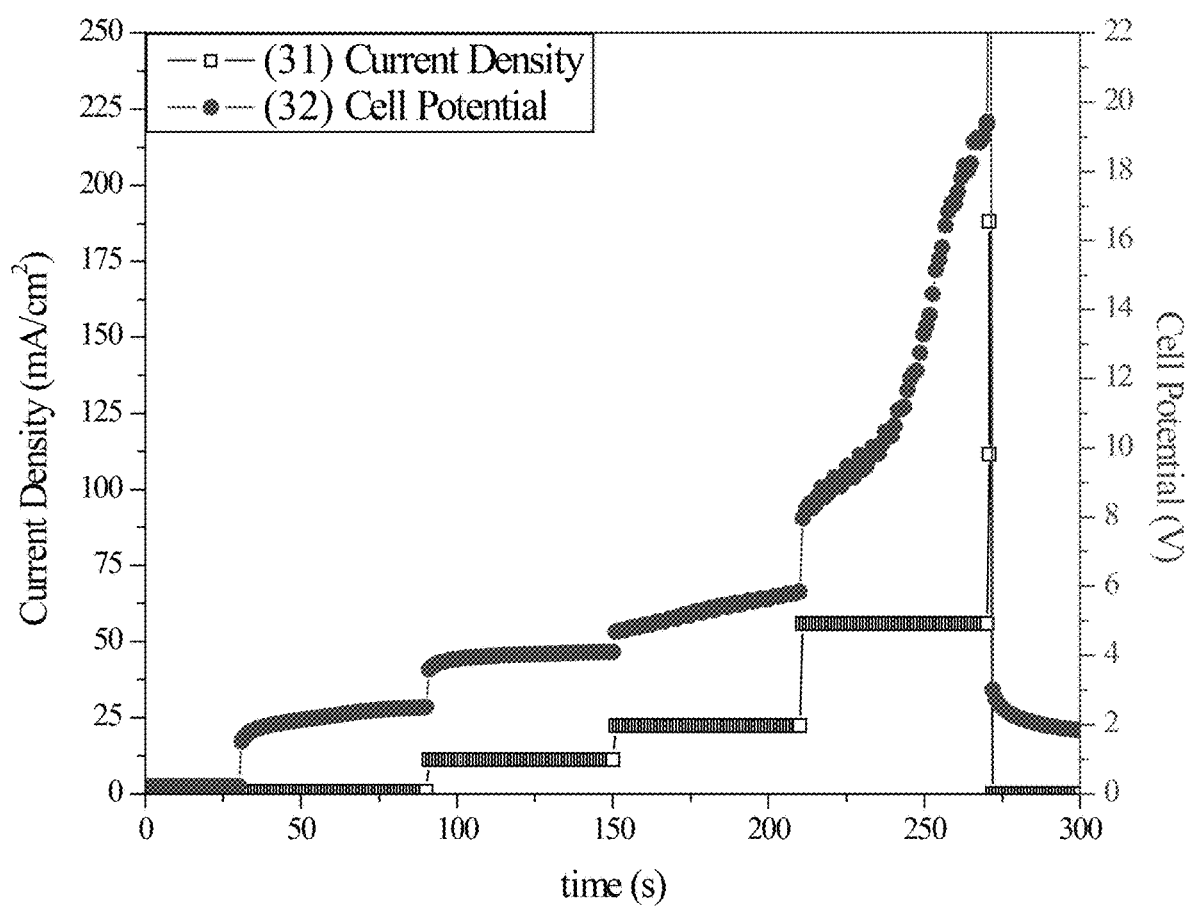
FIG. 12 is the voltage and current transients of the transfer of Zn-ions through the intercalation membrane at multiple current densities.

An intercalation membrane was used to transfer ions from a first medium to a second medium. Zn-ions were transferred from an aqueous solution of zinc nitrate in contact with the anode through an intercalation membrane and to an aqueous solution also containing zinc nitrate. The electrolytes were both made to contain 10 wt % $Zn(NO_3)_2$ making an aqueous solution with a pH between 9 and 10. The temperature of the electrolytes was unchanged, remaining at room temperature for the duration of the experiments. Two different experiments were conducted with the system. The first consisted of a current density step experiment, where the current density was stepped up starting at 0.5 mA/cm² to 250 mA/cm² holding each step for 60 s. The second experiment was a bulk electrolysis experiment, in which the current density was maintained at 35 mA/cm² for the duration of the experiment. The current 29, 31 and potential 30, 32 transients of these experiments can be seen in FIGS. 11 and 12. It can be seen in FIG. 12 that during the step test the cell potential increased from 2 to 20 V as the current density was increased from 0.5 to 250 mA/cm². During the bulk electrolysis at 35 mA/cm² shown in FIG. 11 the cell potential started at 20 V and slowly decreased to 15 V during the 1.5 h duration of the experiment. Comparing the charge transferred according to the number of coulombs passed during the experiment to the change in Zn-ion concentration of the anolyte and catholyte, determined by ICP analysis, a Coulombic efficiency of over 80% was obtained.

Example 6

Figure 13:
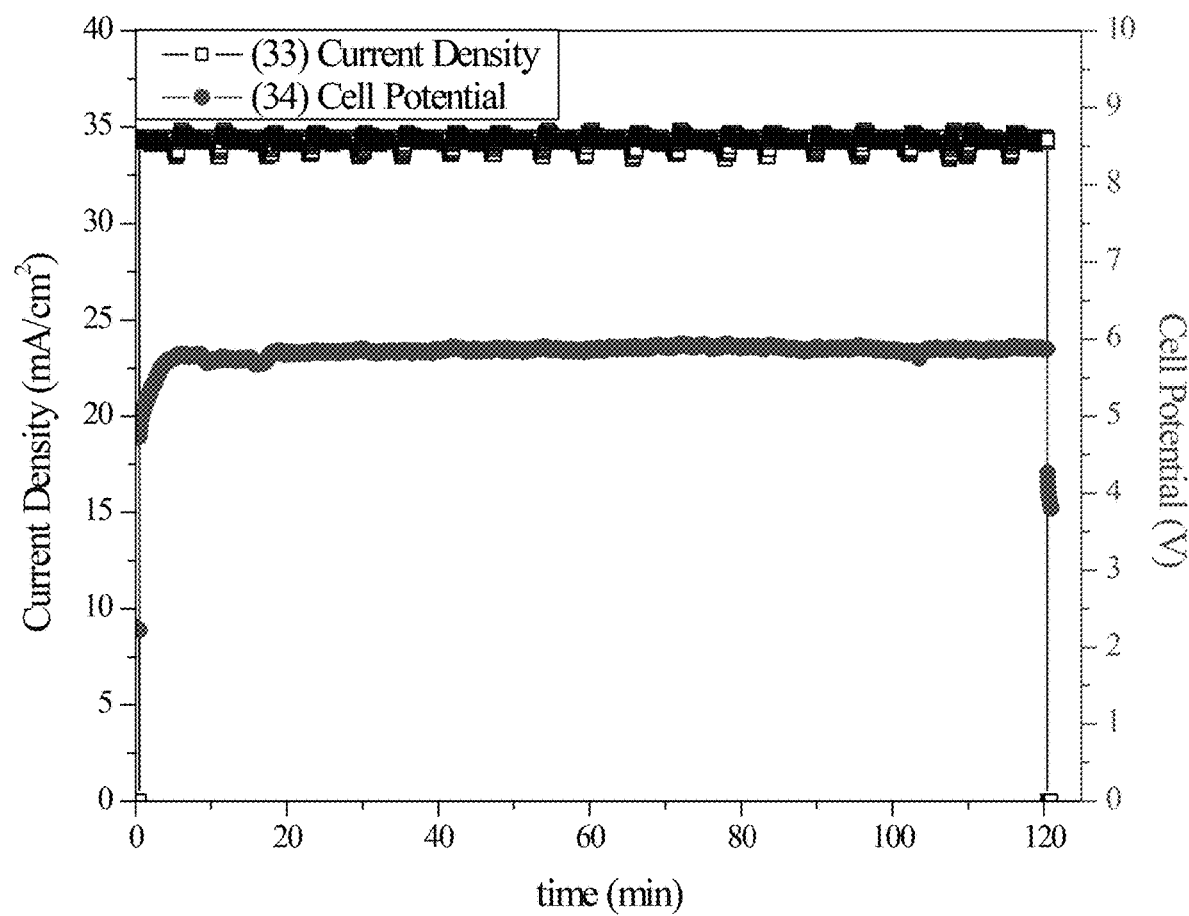
FIG. 13 is the voltage and current transients of the transfer of Pb-ions through the intercalation membrane at a single current density.
Figure 14:
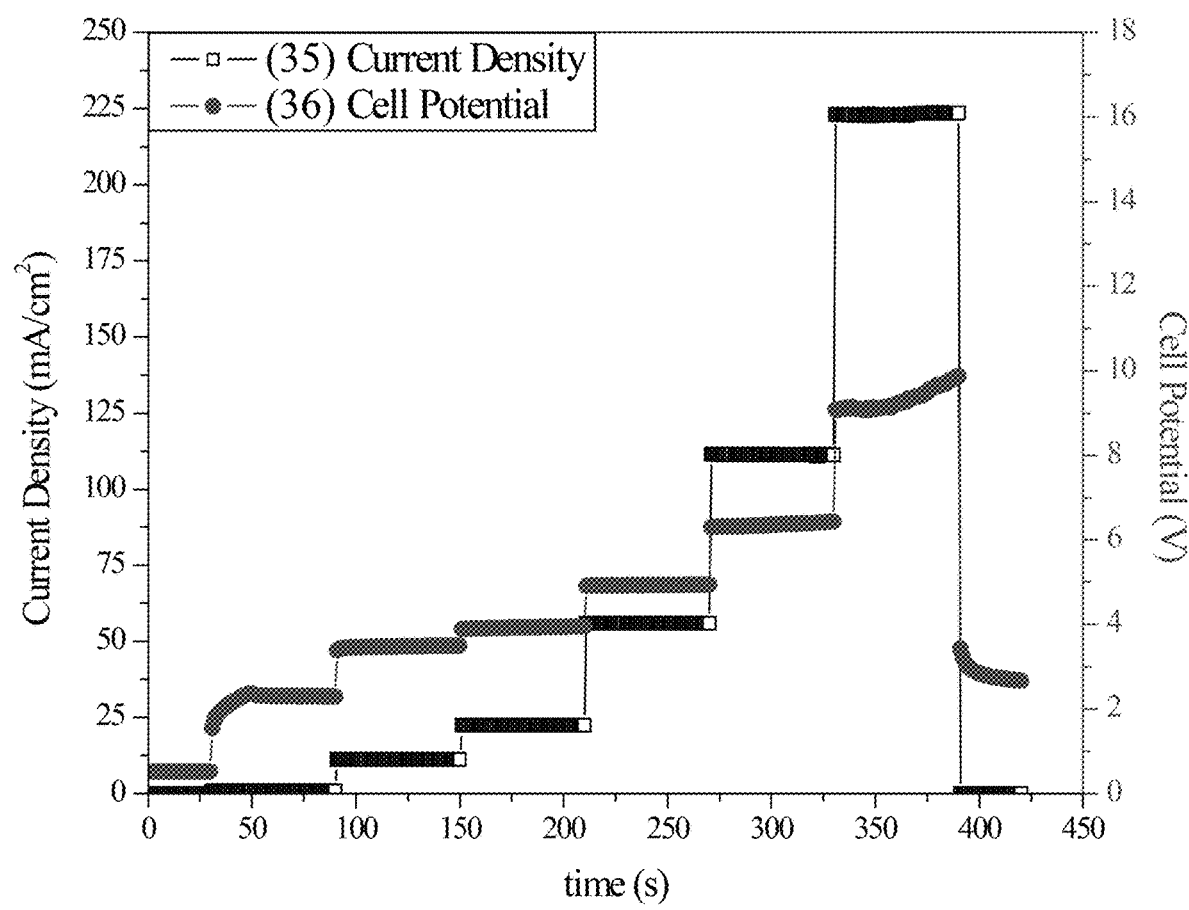
FIG. 14 is the voltage and current transients of the transfer of Pb-ions through the intercalation membrane at multiple current densities.

An intercalation membrane was used to transfer ions from a first medium to a second medium. Pb-ions were transferred from an aqueous solution of lead nitrate in contact with the anode through an intercalation membrane and to an aqueous solution also containing lead nitrate. The electrolytes were both made to contain 10 wt % $Pb(NO_3)_2$ making an aqueous solution with a pH between 9 and 10. The temperature of the electrolytes was unchanged, remaining at room temperature for the duration of the experiments. Two different experiments were conducted with the system. The first consisted of a current density step experiment, where the current density was stepped up starting at 0.5 mA/cm² to 250 mA/cm² holding each step for 60 s. The second experiment was a bulk electrolysis experiment, in which the current density was maintained at 35 mA/cm² for the duration of the experiment. The current 33, 35 and potential 34, 36 transients of these experiments can be seen in FIGS. 13 and 14. It can be seen in FIG. 14 that during the step test the cell potential increased from 3 to 10 V as the current density was increased from 0.5 to 250 mA/cm². During the bulk electrolysis at 35 mA/cm² shown in FIG. 13 the cell potential started at 6 V and maintained this potential during the 2 h duration of the experiment.

Example 7

Figure 15:
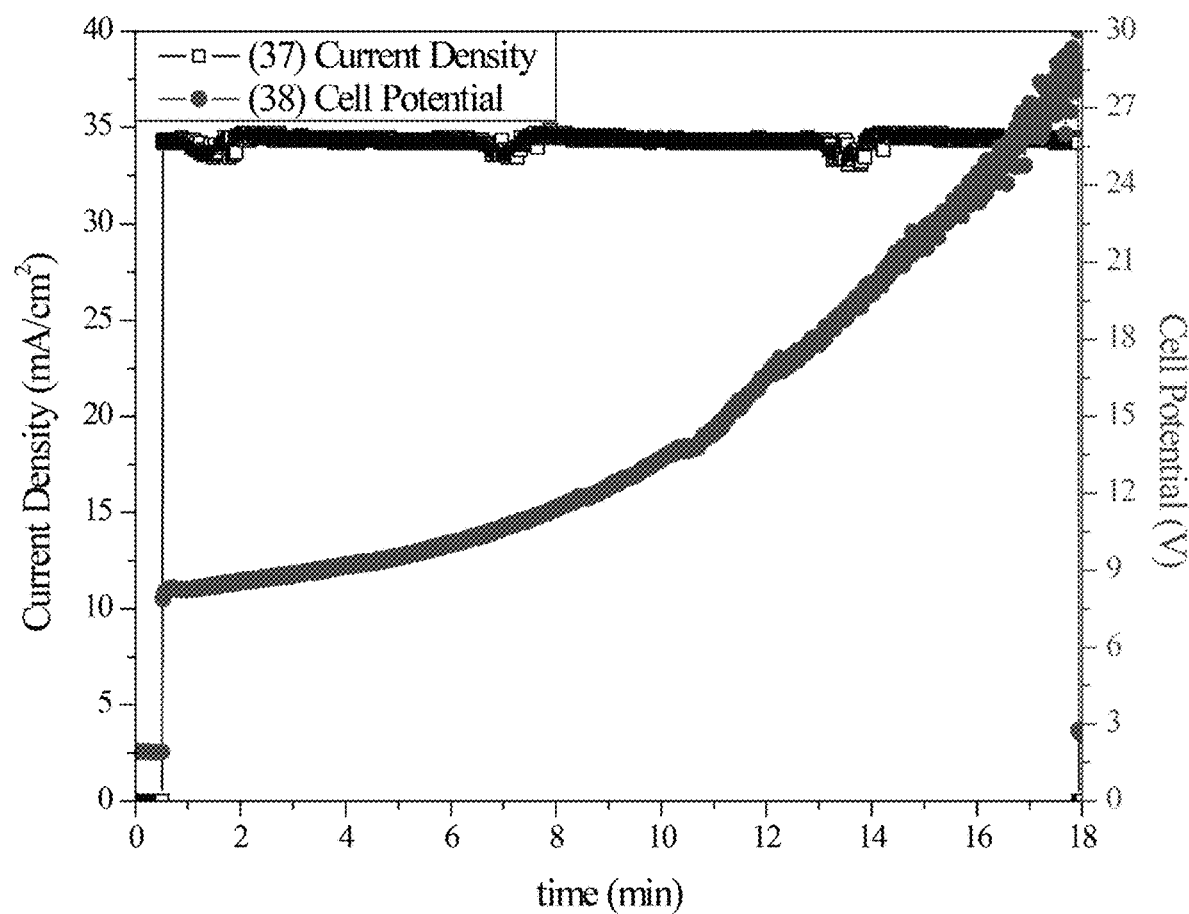
FIG. 15 is the voltage and current transients of the transfer of Ce-ions through the intercalation membrane at a single current density.
Figure 16:
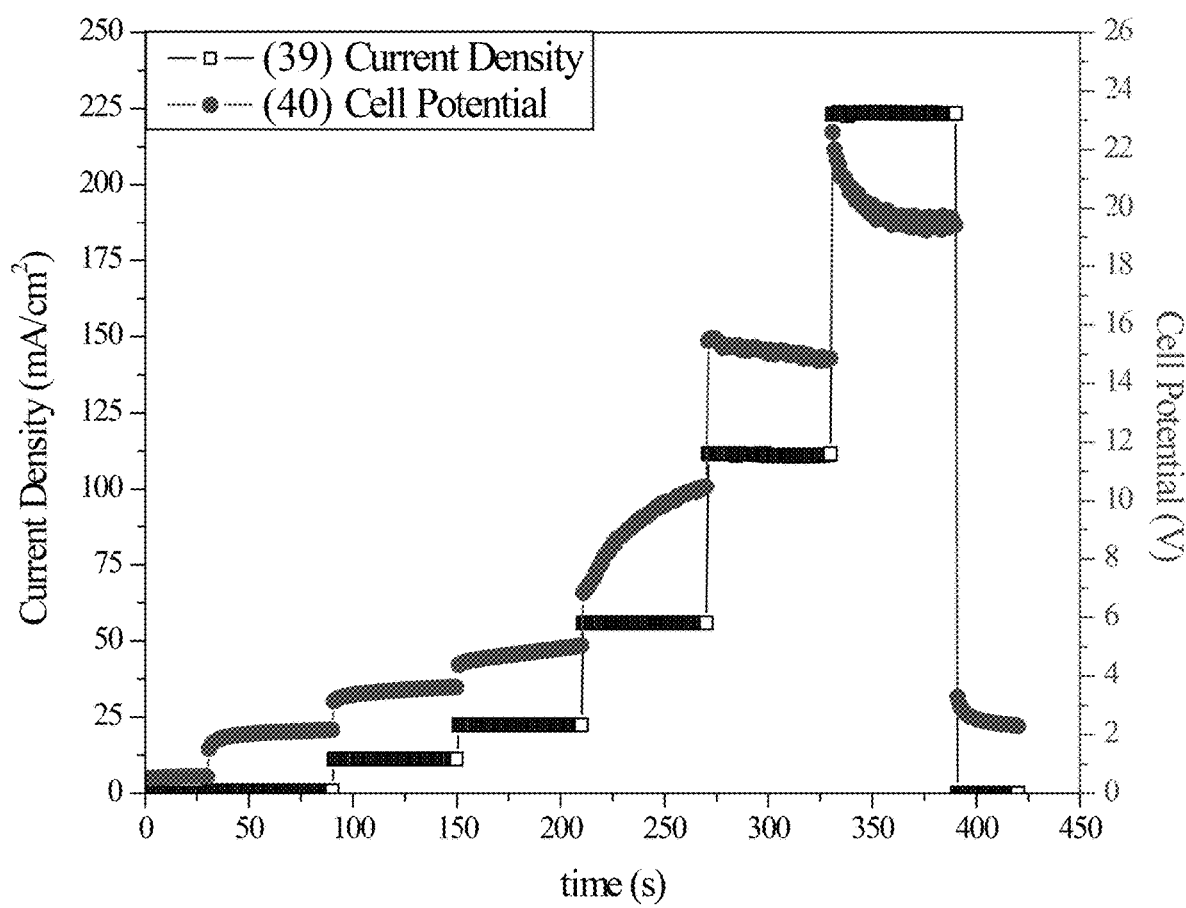
FIG. 16 is the voltage and current transients of the transfer of Ce-ions through the intercalation membrane at multiple current densities.

An intercalation membrane was used to transfer ions from a first medium to a second medium. Ce-ions were transferred from an aqueous solution of cerium nitrate in contact with the anode through an intercalation membrane and to an aqueous solution also containing cerium nitrate. The electrolytes were both made to contain 10 wt % $Ce(NO_3)_3$ making an aqueous solution with a pH between 9 and 10. The temperature of the electrolytes was unchanged, remaining at room temperature for the duration of the experiments. Two different experiments were conducted with the system. The first consisted of a current density step experiment, where the current density was stepped up starting at 0.5 mA/cm² to 250 mA/cm² holding each step for 60 s. The second experiment was a bulk electrolysis experiment, in which the current density was maintained at 35 mA/cm² for the duration of the experiment. The current 37, 39 and potential 38, 40 transients of these experiments can be seen in FIGS. 15 and 16. It can be seen in FIG. 16 that during the step test the cell potential increased from 2 to 22 V as the current density was increased from 0.5 to 250 mA/cm². During the bulk electrolysis at 35 mA/cm² shown in FIG. 15 the cell potential started at 9 V and dramatically increased to 30V during the 18 min of the experiment.

Example 8

Figure 17:
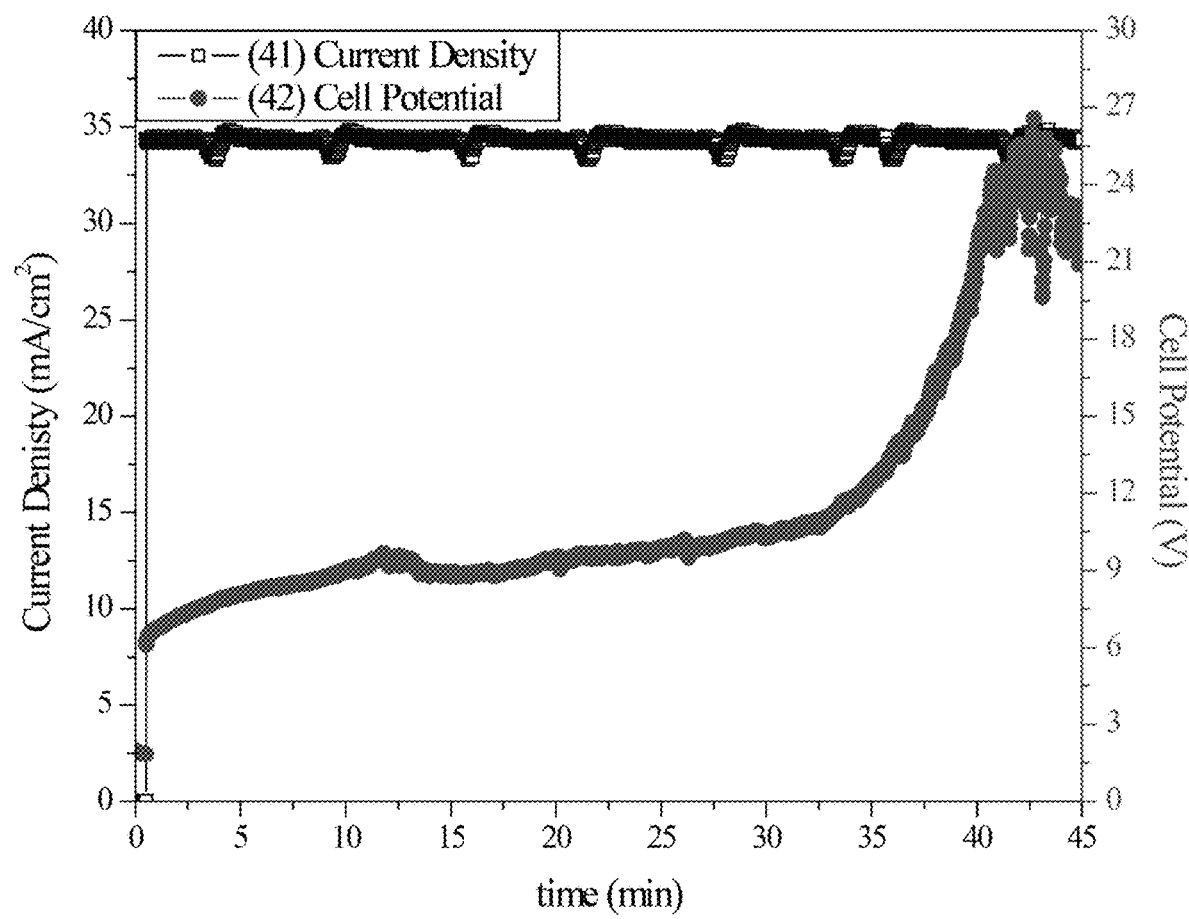
FIG. 17 is the voltage and current transients of the transfer of Y-ions through the intercalation membrane at a single current density.
Figure 18:
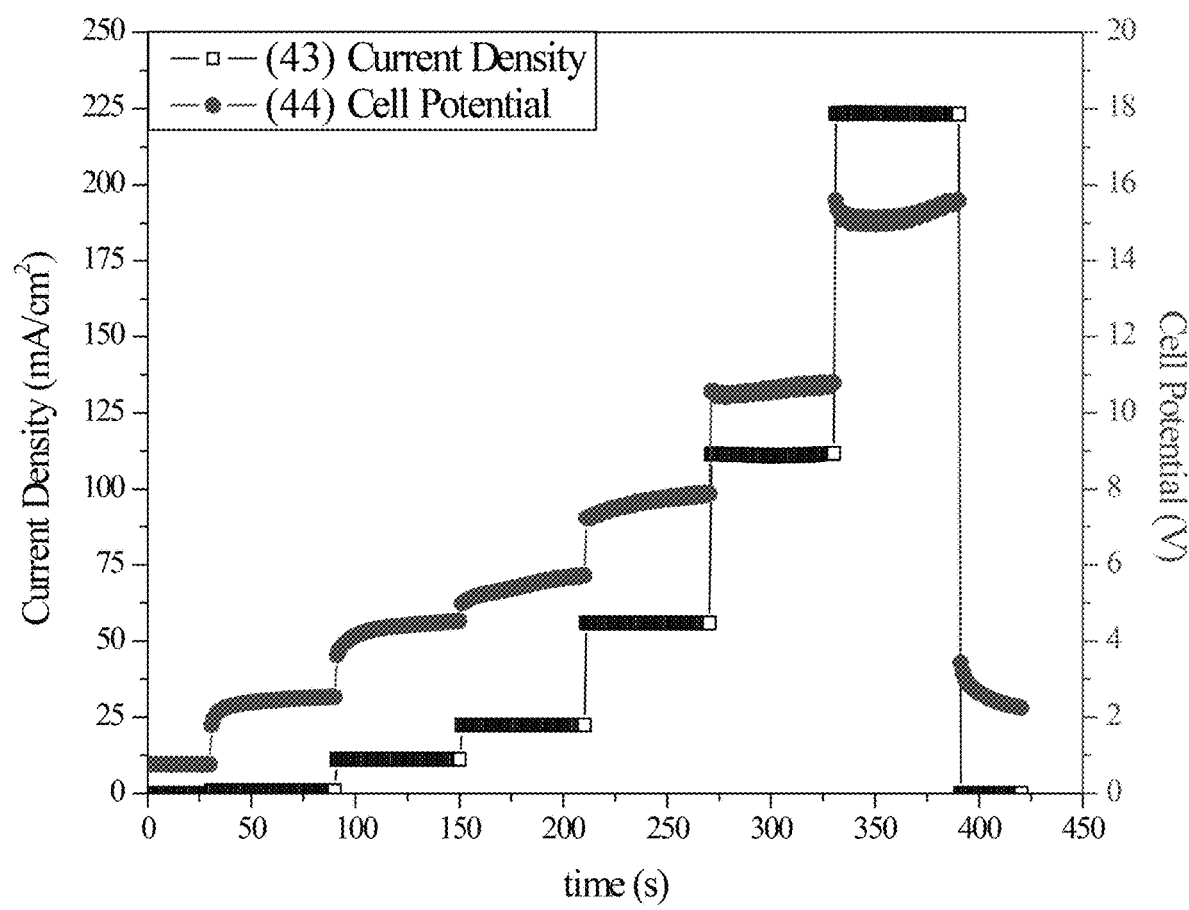
FIG. 18 is the voltage and current transients of the transfer of Y-ions through the intercalation membrane at multiple current densities.

An intercalation membrane was used to transfer ions from a first medium to a second medium. Y-ions were transferred from an aqueous solution of yttrium nitrate in contact with the anode through an intercalation membrane and to an aqueous solution also containing yttrium nitrate. The electrolytes were both made to contain 10 wt % $Y(NO_3)_3$ making an aqueous solution with a pH between 9 and 10. The temperature of the electrolytes was unchanged, remaining at room temperature for the duration of the experiments. Two different experiments were conducted with the system. The first consisted of a current density step experiment, where the current density was stepped up starting at 0.5 mA/cm² to 250 mA/cm² holding each step for 60 s. The second experiment was a bulk electrolysis experiment, in which the current density was maintained at 35 mA/cm² for the duration of the experiment. The current 41, 43 and potential 42, 44 transients of these experiments can be seen in FIGS. 17 and 18. It can be seen in FIG. 18 that during the step test the cell potential increased from 3 to 26 V as the current density was increased from 0.5 to 250 mA/cm². During the bulk electrolysis at 35 mA/cm² shown in FIG. 17 the cell potential started at 6 V and slowly decreased to 27 V during the 45 min duration of the experiment.

Example 9

Figure 19:
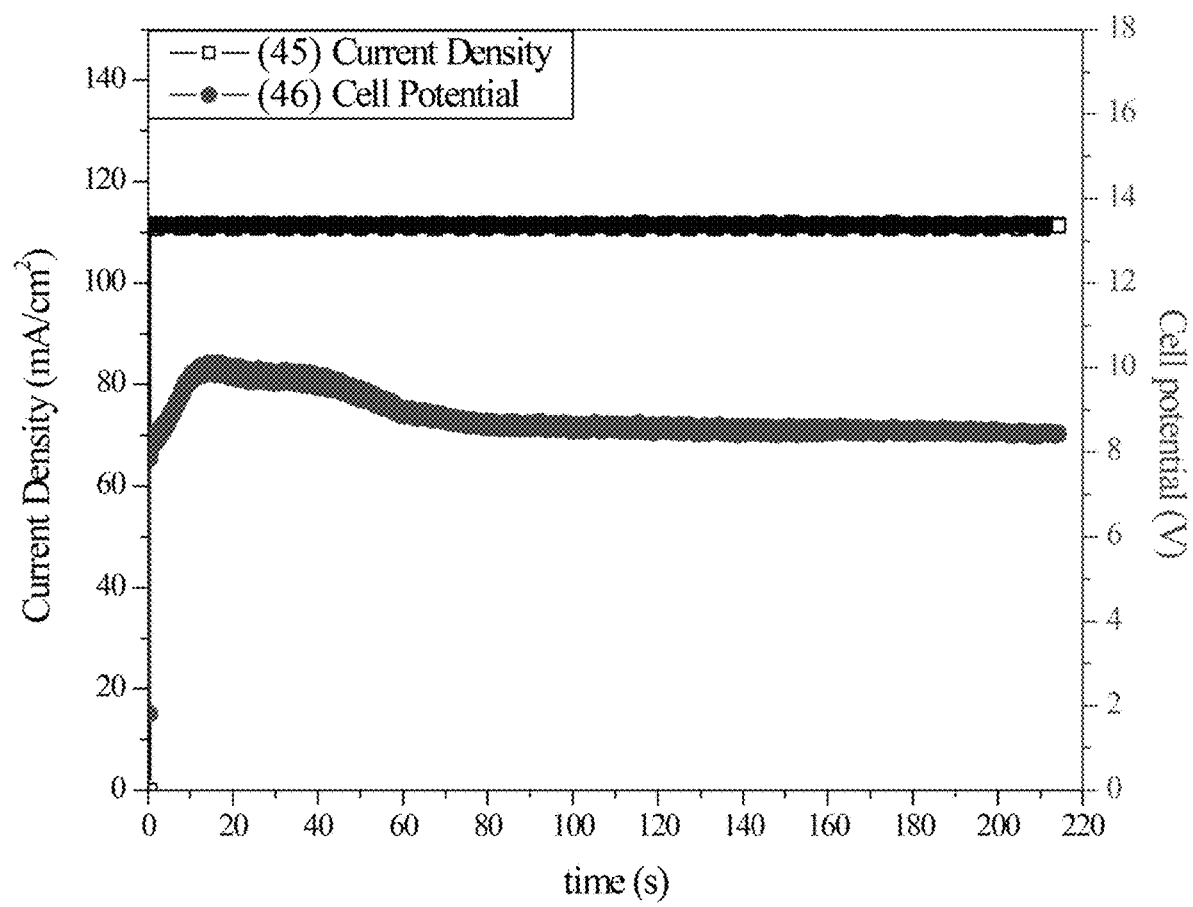
FIG. 19 is the voltage and current transients of the transfer of Na- and K-ions through the intercalation membrane at a single current density.
Figure 20:
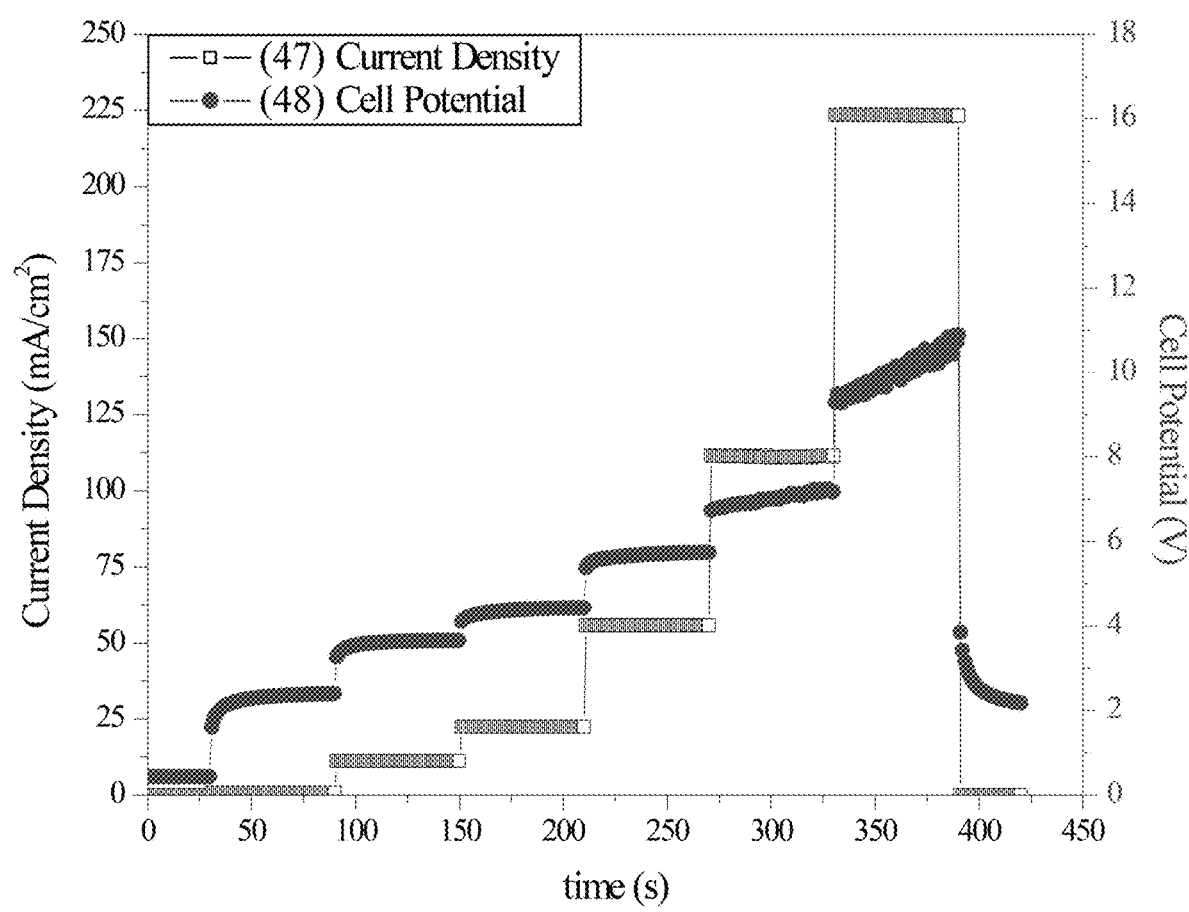
FIG. 20 is the voltage and current transients of the transfer of Na- and K-ions through the intercalation membrane at multiple current densities.

An intercalation membrane was used to transfer ions from a first medium to a second medium. Both Na-ions and K-ions were transferred from an aqueous solution of sodium and potassium sulfate in contact with the anode through an intercalation membrane and to an aqueous solution also containing sodium and potassium sulfate. The electrolytes were both made to contain 10 wt % $Na_2SO_4$ and $K_2SO_4$ making an aqueous solution with a pH between 9 and 10. The temperature of the electrolytes was unchanged, remaining at room temperature for the duration of the experiments. Two different experiments were conducted with the system. The first consisted of a current density step experiment, where the current density was stepped up starting at 0.5 $mA/cm^2$ to 250 $mA/cm^2$ holding each step for 60 s. The second experiment was a bulk electrolysis experiment, in which the current density was maintained at 110 $mA/cm^2$ for the duration of the experiment. The current 45, 47 and potential 46, 48 transients of these experiments can be seen in FIGS. 19 and 20. It can be seen in FIG. 20 that during the step test the cell potential increased from 2 to 14 V as the current density was increased from 0.5 to 250 $mA/cm^2$. During the bulk electrolysis at 110 $mA/cm^2$ shown in FIG. 19 the cell potential started at 10 V and slowly decreased to 8 V during the 3 h duration of the experiment. Comparing the charge transferred according to the number of coulombs passed during the experiment to the change in Na-ion concentration and K-ion concentration of the anolyte and catholyte, determined by ICP analysis, a Coulombic efficiency of over 90% was obtained for the sodium and 90% for the potassium.

While specific embodiments and examples of the present invention have been illustrated and described, numerous modifications come to mind without significantly departing from the spirit of the invention, and the scope of protection is only limited by the scope of the accompanying claims.

The invention claimed is:

1. An electrochemical cell comprising:
    an anode compartment comprising an anode and an anolyte medium, wherein the anode compartment further comprises inlet and outlet ports configured to introduce anolyte medium into the anolyte compartment and to remove anolyte medium from the anolyte compartment;
    a cathode compartment comprising a cathode and a catholyte medium, wherein the cathode compartment further comprises inlet and outlet ports configured to introduce catholyte medium into the catholyte compartment and to remove catholyte medium from the catholyte compartment;
    an ion conductive intercalation membrane separating the anode compartment and the cathode compartment, wherein the intercalation membrane does not receive and release electrons during operation of the electrochemical cell, the intercalation membrane consists essentially of a Chevrel phase ($Mo_6T_8$, where T is S, Se, or Te), and the intercalation membrane transports metal ions selected from ions of Li, Na, K, Mg, Pb, Zn, Y, and Cs; and
    an electric field between the anode and cathode to cause electrons to flow through an external circuit coupled to the anode and cathode and cause the oxidation and reduction reactions to occur and to cause the metal ions to transport through the intercalation membrane from the anode compartment to the cathode compartment to maintain charge neutrality within the electrochemical cell.

2. The electrochemical cell according to claim 1, wherein the intercalation membrane has a density of at least 90%.

3. The electrochemical cell according to claim 1, wherein the intercalation membrane transports a plurality of metal ions selected from ions of Li, Na, K, Mg, Pb, Zn, Y, and Cs.

4. The electrochemical cell of claim 1, wherein the ion conductive intercalation membrane consists of a Chevrel phase ($Mo_6T_8$, where T is S, Se, or Te).

5. A method for operating an electrochemical cell, the method comprising:
    providing the electrochemical cell, the cell comprising:
        an anode compartment comprising an anode at which an oxidation reaction occurs and an anolyte medium, wherein the anode compartment further comprises inlet and outlet ports configured to introduce anolyte medium into the anolyte compartment and to remove anolyte medium from the anolyte compartment;
        a cathode compartment comprising a cathode at which a reduction reaction occurs and a catholyte medium, wherein the cathode compartment further comprises inlet and outlet ports configured to introduce catholyte medium into the catholyte compartment and to remove catholyte medium from the catholyte compartment;
        an ion conductive intercalation membrane separating the anode compartment and the cathode compartment, wherein the intercalation membrane does not receive and release electrons during operation of the electrochemical cell and the intercalation membrane transports metal ions, the intercalation membrane consists essentially of a Chevrel phase ($Mo_6T_8$, where T is S, Se, or Te), and the intercalation membrane transports metal ions selected from ions of Li, Na, K, Mg, Pb, Zn, Y, and Cs; and
        an electric current source connected to the anode and cathode;
    introducing the catholyte medium to the catholyte compartment and the anolyte medium to the anolyte compartment; and
    passing a current between the anode and the cathode to cause electrons to flow through an external circuit coupled to the anode and cathode and to cause metal ions to transport through the intercalation membrane from the anode compartment to the cathode compartment to maintain charge neutrality within the electrochemical cell at a current density greater than 25 $mA/cm^2$ across the intercalation membrane.

6. The method cell according to claim 5, wherein the current density is between 25 $mA/cm^2$ and 250 $mA/cm^2$ across the intercalation membrane.

7. The method according to claim 5, wherein the intercalation membrane comprises an intercalation compound having a host lattice structure and characterized by a reversible uptake of ions at a temperature in the range of 0 to 150° C., while conserving its host lattice structure.

8. The method of claim 5, wherein the ion conductive intercalation membrane consists of a Chevrel phase ($Mo_6T_8$, where T is S, Se, or Te).

* * * * *